United States Patent
Carbone et al.

(10) Patent No.: US 11,838,038 B2
(45) Date of Patent: Dec. 5, 2023

(54) HARDWARE OPTIMIZATION FOR 5G FRACTIONAL BANDWIDTH DIGITAL PRE-DISTORTION

(71) Applicant: QUALCOMM Incorporated, San Diego, CA (US)

(72) Inventors: Nicholas Michael Carbone, San Diego, CA (US); Shubham Ahuja, San Diego, CA (US); Aidin Bassam, San Diego, CA (US); Alexander Dorosenco, El Cajon, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 17/306,718

(22) Filed: May 3, 2021

(65) Prior Publication Data
US 2022/0376713 A1    Nov. 24, 2022

(51) Int. Cl.
H04K 1/02 (2006.01)
H04B 1/00 (2006.01)
H04B 1/40 (2015.01)

(52) U.S. Cl.
CPC ............ *H04B 1/0082* (2013.01); *H04B 1/40* (2013.01)

(58) Field of Classification Search
CPC ............................... H04B 1/0082; H04B 1/40
USPC ........................................................ 375/297
See application file for complete search history.

(56) References Cited

U.S. PATENT DOCUMENTS

| 9,673,848 B2 * | 6/2017 | Kim ..................... H04B 1/0475 |
| 2015/0194989 A1* | 7/2015 | Mkadem ............... H03F 1/3247 |
| | | 375/297 |
| 2017/0317913 A1* | 11/2017 | Kim ..................... H03F 1/0227 |
| 2018/0254852 A1* | 9/2018 | Avivi ........................ H04B 1/40 |

OTHER PUBLICATIONS

Braithwaite R.N., "Closed-Loop Digital Predistortion (DPD) Using an Observation Path with Limited Bandwidth", IEEE Transactions on Microwave Theory and Techniques, vol. 63, No. 2, Feb. 2015, pp. 726-736.
Braithwaite R.N., "Wide Bandwidth Adaptive Digital Predistortion of Power Amplifiers Using Reduced Order Memory Correction", 2008 IEEE MTT-S International Microwave Symposium Digest, Jun. 15-20, 2008, pp. 1517-1520.

* cited by examiner

Primary Examiner — Helene E Tayong
(74) Attorney, Agent, or Firm — QUALCOMM Incorporated

(57) ABSTRACT

Various aspects of the present disclosure generally relate to wireless communication. In some aspects, a transceiver chain may receive, using a downconverter tuned by at least one local oscillator, transmit signals that are modulated using a modulation bandwidth and that span a total bandwidth greater than or equal to the modulation bandwidth. The at least one local oscillator may cover a first fraction of the total bandwidth. The transceiver chain may receive, using at least one analog-to-digital converter, input from the downconverter, and may output a first digital signal based at least in part on the input and sampling at the first fraction of the total bandwidth. The transceiver chain may determine an error associated with the transmit signals based at least in part on the first digital signal, and may perform digital pre-distortion on new signals based at least in part on the error. Numerous other aspects are described.

30 Claims, 12 Drawing Sheets

HARDWARE OPTIMIZATION FOR 5G FRACTIONAL BANDWIDTH DIGITAL PRE-DISTORTION

FIELD OF THE DISCLOSURE

Aspects of the present disclosure generally relate to wireless communication and to techniques and apparatuses for optimizing 5G fractional bandwidth digital pre-distortion.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a transceiver chain for wireless communication includes at least one local oscillator configured to tune a downconverter to receive transmit signals that are modulated using a modulation bandwidth and that span a total bandwidth greater than or equal to the modulation bandwidth, wherein the at least one local oscillator is configured to cover a first fraction of the total bandwidth; at least one analog-to-digital converter (ADC) configured to receive input from the downconverter and to output a first digital signal based at least in part on the input and sampling at the first fraction of the total bandwidth; and at least one processor configured to determine an error associated with the transmit signals based at least in part on the first digital signal output by the at least one ADC and to perform digital pre-distortion on new signals for transmission based at least in part on the error.

In some aspects, a transceiver chain for wireless communication includes at least one local oscillator configured to tune a downconverter to receive transmit signals that are modulated using a modulation bandwidth and that span a total bandwidth greater than or equal to the modulation bandwidth; at least one ADC configured to receive input from the downconverter and to output a first digital signal based at least in part on the input; and at least one processor configured to determine an error associated with the transmit signals based at least in part on the first digital signal output by the at least one ADC and to perform digital pre-distortion on new signals for transmission based at least in part on the error, wherein the at least one processor is configured to determine the digital pre-distortion using a least squares regression at a sub-rate corresponding to a first fraction of the total bandwidth.

In some aspects, a transceiver chain for wireless communication includes at least one local oscillator configured to tune a downconverter to receive transmit signals that are modulated using a modulation bandwidth and that span a total bandwidth greater than or equal to the modulation bandwidth; at least one ADC configured to receive input from the downconverter and to output a first digital signal based at least in part on the input; and at least one processor configured to determine an error associated with the transmit signals based at least in part on the first digital signal output by the at least one ADC and to perform digital pre-distortion on new signals for transmission based at least in part on the error, wherein the error is based at least in part on output from the at least one ADC that represents a subset of the total bandwidth.

In some aspects, a method of wireless communication performed by a transceiver chain includes receiving, using a downconverter tuned by at least one local oscillator, transmit signals that are modulated using a modulation bandwidth and that span a total bandwidth greater than or equal to the modulation bandwidth, wherein the at least one local oscillator is configured to cover a first fraction of the total bandwidth; receiving, using at least one ADC, input from the downconverter; outputting, using the at least one ADC, a first digital signal based at least in part on the input and sampling at the first fraction of the total bandwidth; determining, using at least one processor, an error associated with the transmit signals based at least in part on the first digital signal output by the at least one ADC; and performing, using the at least one processor, digital pre-distortion on new signals for transmission based at least in part on the error.

In some aspects, a method of wireless communication performed by a transceiver chain includes receiving, using a downconverter tuned by at least one local oscillator, transmit signals that are modulated using a modulation bandwidth and that span a total bandwidth greater than or equal to the modulation bandwidth; receiving, using at least one ADC, input from the downconverter; outputting, using the at least one ADC, a first digital signal based at least in part on the input; determining, using at least one processor, an error associated with the transmit signals based at least in part on the first digital signal output by the at least one ADC; and performing, using the at least one processor, digital pre-distortion on new signals for transmission based at least in part on the error, wherein the at least one processor is configured to determine the digital pre-distortion using a least squares regression at a sub-rate corresponding to a first fraction of the total bandwidth.

In some aspects, a method of wireless communication performed by a transceiver chain includes receiving, using a downconverter tuned by at least one local oscillator, transmit signals that are modulated using a modulation bandwidth and that span a total bandwidth greater than or equal to the modulation bandwidth; receiving, using at least one ADC, input from the downconverter; outputting, using the at least one ADC, a first digital signal based at least in part on the input; determining, using at least one processor, an error associated with the transmit signals based at least in part on the first digital signal output by the at least one ADC; and performing, using the at least one processor, digital pre-distortion on new signals for transmission based at least in part on the error, wherein the error is based at least in part on output from the at least one ADC that represents a subset of the total bandwidth.

In some aspects, a non-transitory computer-readable medium storing a set of instructions for wireless communication includes one or more instructions that, when executed by one or more processors of a transceiver chain, cause the transceiver chain to receive, using a downconverter tuned by at least one local oscillator, transmit signals that are modulated using a modulation bandwidth and that span a total bandwidth greater than or equal to the modulation bandwidth, wherein the at least one local oscillator is configured to cover a first fraction of the total bandwidth; receive, using at least one ADC, input from the downconverter; output, using the at least one ADC, a first digital signal based at least in part on the input and sampling at the first fraction of the total bandwidth; determine an error associated with the transmit signals based at least in part on the first digital signal output by the at least one ADC; and perform digital pre-distortion on new signals for transmission based at least in part on the error.

In some aspects, a non-transitory computer-readable medium storing a set of instructions for wireless communication includes one or more instructions that, when executed by one or more processors of a transceiver chain, cause the transceiver chain to receive, using a downconverter tuned by at least one local oscillator, transmit signals that are modulated using a modulation bandwidth and that span a total bandwidth greater than or equal to the modulation bandwidth; receive, using at least one ADC, input from the downconverter; output, using the at least one ADC, a first digital signal based at least in part on the input; determine an error associated with the transmit signals based at least in part on the first digital signal output by the at least one ADC; and perform digital pre-distortion on new signals for transmission based at least in part on the error, wherein the at least one processor is configured to determine the digital pre-distortion using a least squares regression at a sub-rate corresponding to a first fraction of the total bandwidth.

In some aspects, a non-transitory computer-readable medium storing a set of instructions for wireless communication includes one or more instructions that, when executed by one or more processors of a transceiver chain, cause the transceiver chain to receive, using a downconverter tuned by at least one local oscillator, transmit signals that are modulated using a modulation bandwidth and that span a total bandwidth greater than or equal to the modulation bandwidth; receive, using at least one ADC, input from the downconverter; output, using the at least one ADC, a first digital signal based at least in part on the input; determine an error associated with the transmit signals based at least in part on the first digital signal output by the at least one ADC; and perform digital pre-distortion on new signals for transmission based at least in part on the error, wherein the error is based at least in part on output from the at least one ADC that represents a subset of the total bandwidth.

In some aspects, an apparatus for wireless communication includes means for receiving transmit signals that are modulated using a modulation bandwidth and that span a total bandwidth greater than or equal to the modulation bandwidth, wherein the means for receiving are configured to cover a first fraction of the total bandwidth; means for outputting a first digital signal based at least in part on input including the received transmit signals and sampling at the first fraction of the total bandwidth; means for determining an error associated with the transmit signals based at least in part on the first digital signal; and means for performing digital pre-distortion on new signals for transmission based at least in part on the error.

In some aspects, an apparatus for wireless communication includes means for receiving transmit signals that are modulated using a modulation bandwidth and that span a total bandwidth greater than or equal to the modulation bandwidth; means for outputting a first digital signal based at least in part on input including the received transmit signals; means for determining an error associated with the transmit signals based at least in part on the first digital signal; and means for performing digital pre-distortion on new signals for transmission based at least in part on the error, wherein the means for performing digital predistortion are configured to determine the digital pre-distortion using a least squares regression at a sub-rate corresponding to a first fraction of the total bandwidth.

In some aspects, an apparatus for wireless communication includes means for receiving transmit signals that are modulated using a modulation bandwidth and that span a total bandwidth greater than or equal to the modulation bandwidth; means for outputting a first digital signal based at least in part on input including the received transmit signals; means for determining an error associated with the transmit signals based at least in part on the first digital signal; and means for performing digital pre-distortion on new signals for transmission based at least in part on the error, wherein the error is based at least in part on output from the at least one ADC that represents a subset of the total bandwidth.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
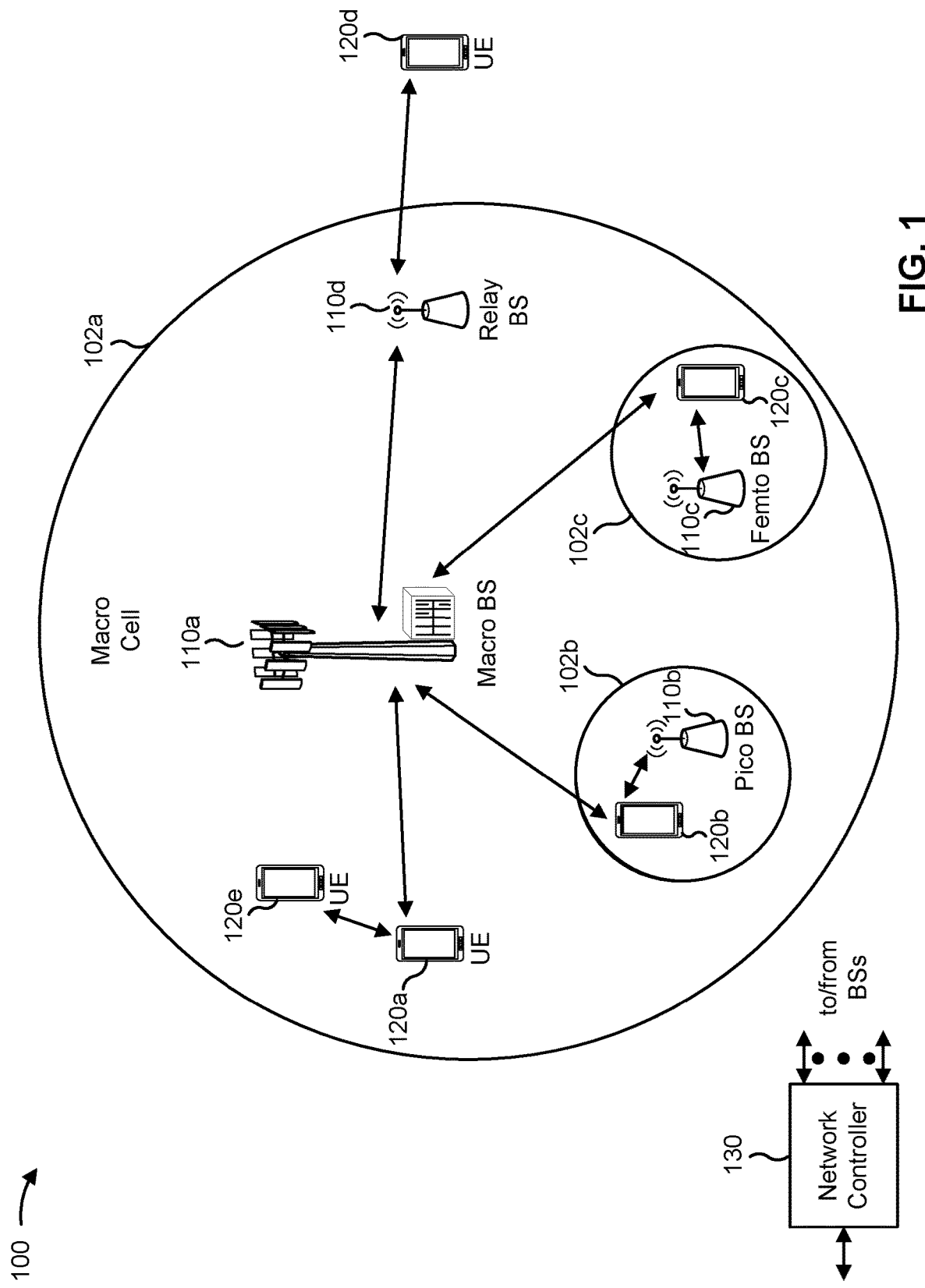
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" or "mmW" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
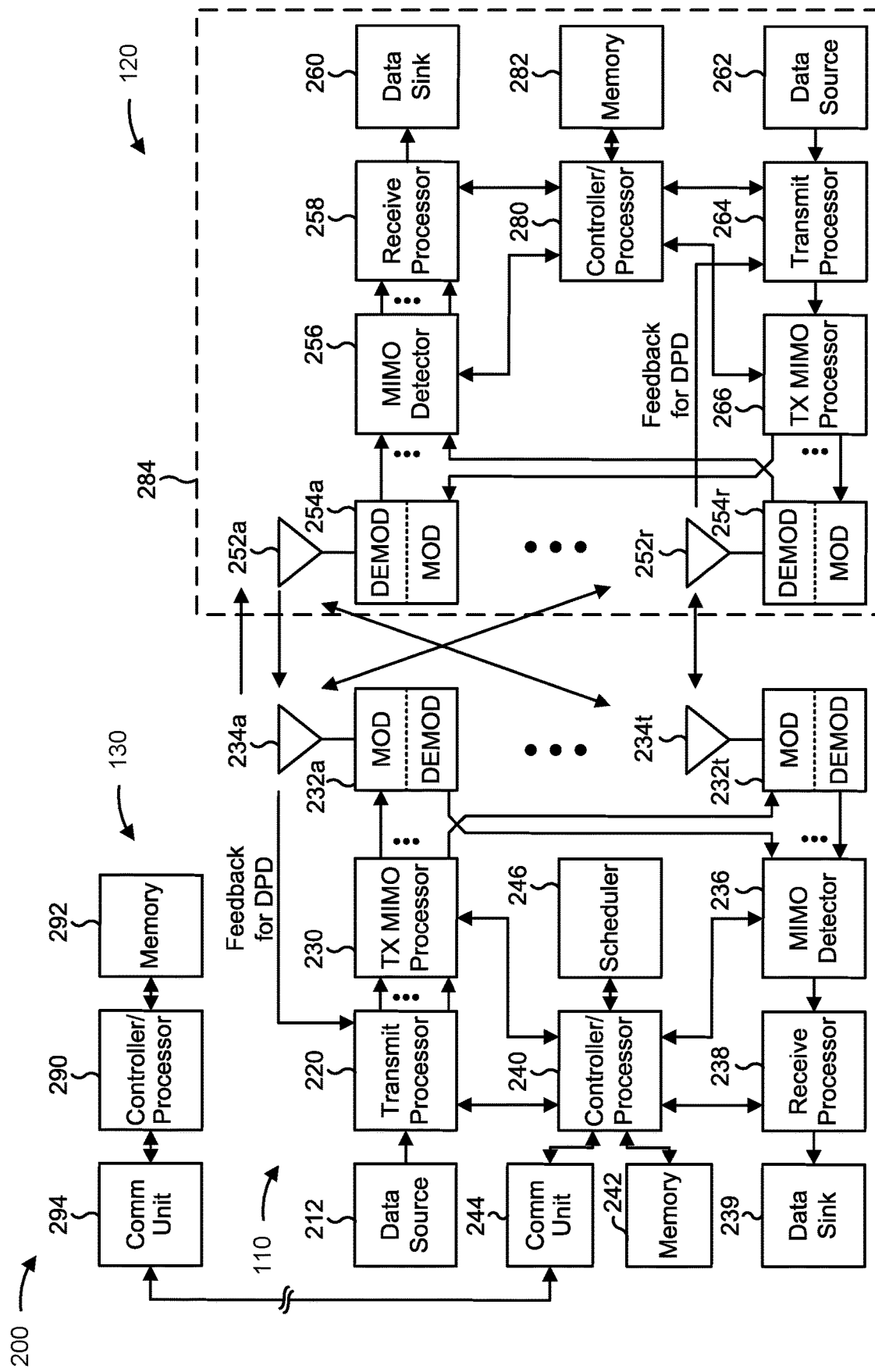
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

As further shown in FIG. 2, the transceiver chain for the base station 110 (which may include the transmit processor 220, the TX MIMO processor 230, the modulators 232, and/or the antennas 234) may receive transmit signals (e.g., using a downconverter tuned by a local oscillator) to use as feedback for a DPD process. The DPD process may be used to feed digital distortion into new transmit signals before the new signals are modulated and transmitted over-the-air (OTA). This digital distortion may account for non-linearity of a linear amplifier within the transceiver chain such that noise within the new transmit signals is reduced (e.g., via error vector magnitude (EVM) correction) and/or noise within neighboring bands is reduced (e.g., via adjacent channel leakage power ratio (ACLR) correction).

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

As further shown in FIG. 2, the transceiver chain for the UE 120 (which may include the transmit processor 264, the TX MIMO processor 266, the modulators 254, and/or the antennas 252) may receive transmit signals (e.g., using a downconverter tuned by a local oscillator) to use as feedback for a DPD process. The DPD process may be used to feed digital distortion into new transmit signals before the new signals are modulated and transmitted OTA. This digital distortion may account for non-linearity of a linear amplifier within the transceiver chain such that noise within the new transmit signals is reduced (e.g., via EVM correction) and/or noise within neighboring bands is reduced (e.g., via ACLR correction).

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 3-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 3-11).

Controller/processor 240 of base station 110, controller/processor 280 of UE 120, and/or any other component(s) of FIG. 2 may perform one or more techniques associated with optimizing 5G fractional bandwidth DPD, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, and/or other processes as described herein. In some aspects, executing instructions may include running the instructions, converting the instructions, compiling the instructions, and/or interpreting the instructions, among other examples. In some aspects, the transceiver chain described herein is included in the UE 120, or includes one or more components of the UE 120 shown in FIG. 2. As an alternative, the transceiver chain described herein is included in the base station 110, or includes one or more components of the base station 110 shown in FIG. 2.

In some aspects, a transceiver chain (e.g., included in the UE 120 and/or the base station 110) may include means for receiving transmit signals that are modulated using a modulation bandwidth and that span a total bandwidth greater than or equal to the modulation bandwidth, wherein the means for receiving are configured to cover a first fraction of the total bandwidth; means for outputting a first digital signal based at least in part on input including the received transmit signals and sampling at the first fraction of the total bandwidth; means for determining an error associated with the transmit signals based at least in part on the first digital signal; and/or means for performing digital pre-distortion on new signals for transmission based at least in part on the error. In some aspects, the means for the transceiver chain to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. As an alternative, the means for the transceiver chain to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a transceiver chain (e.g., included in the UE 120 and/or the base station 110) may include means for receiving transmit signals that are modulated using a modulation bandwidth and that span a total bandwidth greater than or equal to the modulation bandwidth; means for outputting a first digital signal based at least in part on input including the received transmit signals; means for determining an error associated with the transmit signals based at least in part on the first digital signal; and/or means for performing digital pre-distortion on new signals for transmission based at least in part on the error, wherein the means for performing digital pre-distortion are configured to determine the digital pre-distortion using a least squares regression at a sub-rate corresponding to a first fraction of the total bandwidth. In some aspects, the means for the transceiver chain to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. As an alternative, the means for the transceiver chain to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the transceiver chain includes means for receiving transmit signals that are modulated using a modulation bandwidth and that span a total bandwidth greater than or equal to the modulation bandwidth; means for outputting a first digital signal based at least in part on input including the received transmit signals; means for determining an error associated with the transmit signals based at least in part on the first digital signal; and/or means for performing digital pre-distortion on new signals for transmission based at least in part on the error, wherein the error is based at least in part on output from the at least one ADC that represents a subset of the total bandwidth. In some aspects, the means for the transceiver chain to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. As an alternative, the means for the transceiver chain to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

As described above in connection with FIG. 2, both UEs and base stations may use DPD techniques to correct for non-linearity of power amplifiers in transceiver chains. However, DPD techniques usually rely on analog-to-digital converters (ADCs) that operate at bandwidths that include a total bandwidth at least as large as a modulation bandwidth in which the transmit signals are generated. Similarly, subsequent digital processing is generally clocked proportionally to the total bandwidth. This process consumes significant amounts of power. For example, for mmW bands in 5G, the modulation bandwidth may be 2 GHz, the total bandwidth may be 10 GHz, and a corresponding ADC operating at the total bandwidth may consume 500 mW. Similarly, processors that use the output from the ADC consume large amounts of power when clocked proportionally to the 10 GHz total bandwidth.

Some techniques and apparatuses described herein enable a local oscillator and ADC to operate at lower bandwidths. The local oscillator and the ADC may thus shift in order to cover the total bandwidth. As an alternative, multiple local oscillators and ADCs, each operating at a lower bandwidth, may cover the total bandwidth. As a result, power is conserved, and DPD techniques can still be applied with comparable levels of accuracy.

Additionally, or alternatively, some techniques and apparatuses described herein enable a processor to operate a rate proportional to lower bandwidths. The processor may thus operate at a slower rate than the local oscillator and the ADC (or at an equal rate when the local oscillator and the ADC operate at the lower bandwidth). As a result, power is conserved, and DPD techniques can still be applied with comparable levels of accuracy.

Additionally, or alternatively, some techniques and apparatuses described herein enable a processor to perform DPD for a subset of a total bandwidth. As a result, power is conserved, and the processor's speed is increased. Additionally, the accuracy decrease for the DPD is not significant in many situations.

Figure 3:
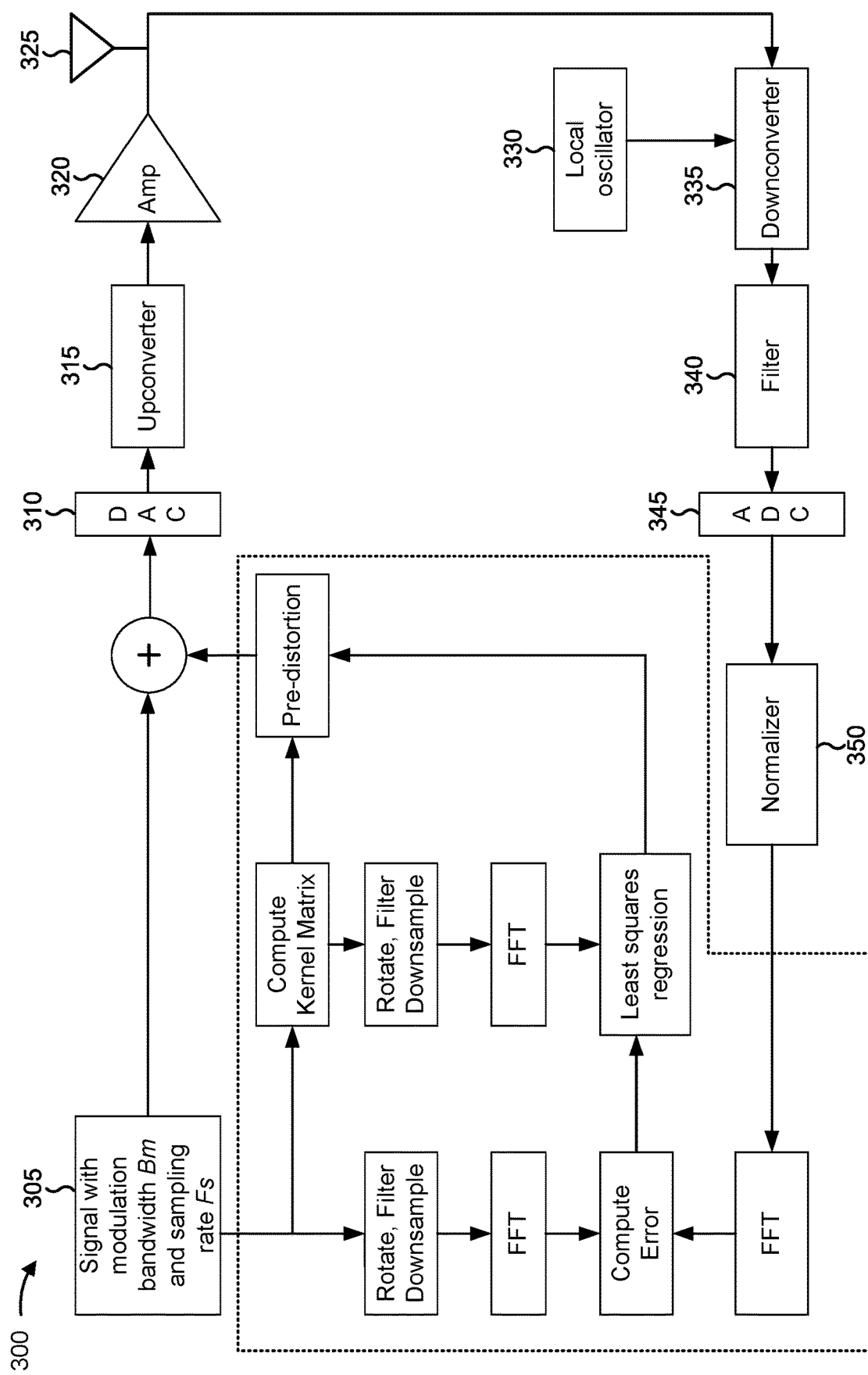
FIGS. 3 and 4 are diagrams illustrating example architectures for optimizing 5G fractional bandwidth digital pre-distortion (DPD) in a frequency domain, in accordance with the present disclosure.

FIG. 3 is a diagram illustrating an example architecture 300 for optimizing 5G fractional bandwidth DPD in a frequency domain, in accordance with the present disclosure. Example 300 may be included in a transceiver chain of a UE (e.g., UE 120) and/or a transceiver chain of a base station (e.g., base station 110).

As shown in FIG. 3, a signal 305 may be modulated using a modulation bandwidth (e.g., represented by Bm) and may have an associated sampling rate (e.g., represented by Fs). For example, the modulation bandwidth Bm may be 2 GHz or higher for mmW communications in 5G. In some aspects, due to leakage into neighboring bands, the signal 305 may be transmitted in a total bandwidth (e.g., represented by Bd) that includes distortions in the neighboring bands. The total bandwidth may be greater than or equal to the modulation bandwidth (e.g., Bd≥Bm). For example, the total bandwidth Bd may be 10 GHz or higher for mmW communications in 5G. Similarly, the total bandwidth may be associated with a sampling rate (e.g., represented by Ds) that is larger than the associated sampling rate (e.g., Ds≥Fs).

The signal 305 may pass through a digital-to-analog converter (DAC) 310 and be upconverted to radio frequency (RF) by an upconverter 315 before being amplified at a power amplifier 320. The power amplifier 320 may amplify an analog signal that is output from the upconverter 315 and is based at least in part on an analog signal output by the DAC 310 and corresponding to the signal 305. Accordingly, an antenna 325 may generate a transmit signal OTA based at least in part on the amplified analog signal from the power amplifier 320.

However, the power amplifier 320 may have non-linearities that introduce distortion into the transmit signal. The distortion may be included in portions of the amplified analog signal corresponding to the modulation bandwidth Bm and/or may include leakages into neighboring bands that are within the total bandwidth Bd. In order to compensate for these non-linearities, a local oscillator 330 may tune a downconverter 335 to receive the transmit signal corresponding to the signal 305. The local oscillator 330 may be included in a direct conversion receiver or an intermediate frequency (IF) receiver. Although depicted separately from the downconverter 335, in some aspects, the local oscillator 330 may be at least partially integrated with the downconverter 335. In some aspects, the local oscillator 330 may be configured to cover a first fraction (e.g., represented by 1/N) of the total bandwidth Bd, such as a 400 MHz fraction of a 3600 MHz total bandwidth. For example, a controller associated with the local oscillator 330 may instruct the local oscillator to generate a tuning signal in order to tune the downconverter 335 to a central frequency within the first fraction and cover a range above and below the central frequency such that the range comprises the first fraction of the total bandwidth Bd. As a result, the local oscillator 330 may conserve power as compared with being configured to cover the total bandwidth Bd.

As further shown in FIG. 3, the downconverter 335 may provide input to an ADC 345, where the input is based at least in part on the received transmit signal (corresponding to the signal 305). In some aspects, the input is further filtered by a filter 340 before being provided to the ADC 345. The ADC 345 (and optionally the filter 340) may sample at the first fraction of the total bandwidth and output a digital signal based at least in part on the input. For example, the ADC 345 (and optionally the downconverter 335 and/or the filter 340) may be configured to operate at a sampling rate corresponding to the first fraction (e.g., at a clock rate proportional to Ds/N, where Ds is the sampling rate corresponding to the total bandwidth). As a result, the ADC 345 (and optionally the downconverter 335 and/or the filter 340) may conserve power as compared with operating at a sampling rate corresponding to the total bandwidth Bd.

Accordingly, a processor 355 may determine an error associated with the signal 305 based at least in part on the digital signal output by the ADC 345. In some aspects, the digital signal is further normalized by a normalizer 350 before being provided to the processor 355.

As shown in FIG. 3, the processor 355 may determine the error based at least in part on a band error computed in a frequency domain (e.g., as described below in connection with FIG. 5). Accordingly, the processor 355 may perform a fast Fourier transform (FFT) and/or another transform from a time domain into the frequency domain on the digital signal output by the ADC 345 and on the signal 305. In some aspects, the signal 305 may be rotated, filtered, and/or downsampled before undergoing FFT. For example, the processor 355 may rotate, filter, and/or downsample the signal 305 based at least in part on the first fraction.

Accordingly, the processor 355 may determine the error, in the frequency domain, based at least in part on the signal 305 and the digital signal output by the ADC 345. In some aspects, the local oscillator 330 may be configured (e.g., by the controller) to shift to a second fraction of the total bandwidth. For example, the local oscillator 330 may generate a different tuning signal in order to tune the downconverter 335 to a central frequency within the second fraction and cover a range above and below the central frequency such that the range comprises the second fraction of the total bandwidth Bd. Accordingly, the ADC 345 may output a second digital signal based at least in part on sampling at the second fraction of the total bandwidth. Further, the processor 355 may determine the error based at least in part on the second digital signal output by the ADC 345. Thus, the processor 355 may determine the error iteratively (e.g., as described below in connection with FIG. 5) as the local oscillator 330 shifts to different fractions of the total bandwidth.

In some aspects, the local oscillator 330 may shift over time such that the total bandwidth is covered incrementally. Accordingly, the processor 355 may determine the error based at least in part on outputs from the ADC 345 that represent the total bandwidth. As an alternative, the local oscillator 330 may shift over time such that a portion of the total bandwidth is covered. For example, the local oscillator 330 may be configured to cover a first fraction of the total bandwidth (e.g., frequencies from −600 MHz to −200 MHz of a reference frequency), shift to cover a second fraction of the total bandwidth (e.g., frequencies from +200 MHz to +600 MHz of the reference frequency), and not cover a third fraction of the total bandwidth (e.g., frequencies from −200 MHz to +200 MHz of the reference frequency). Accordingly, the processor 355 may determine the error based at least in part on outputs from the ADC 345 that represent a subset of the total bandwidth. As a result, the processor 355 may conserve power and reduce convergence time when running a least squares regression (e.g., as described below) as compared with using outputs from the ADC 345 that represent the total bandwidth.

In some aspects, the subset of the total bandwidth covered by the local oscillator 330 and the ADC 345 may vary. For example, the local oscillator 330 and the ADC 345 may cover a first fraction of the total bandwidth (e.g., frequencies from −400 MHz to −200 MHz of a reference frequency), a second fraction of the total bandwidth (e.g., frequencies from the reference frequency to +200 MHz of the reference frequency), and so on, iteratively covering the subset of the total bandwidth, for a first period of time and/or a first quantity of clock cycles. Thereafter, the local oscillator 330 and the ADC 345 may cover a third fraction of the total bandwidth (e.g., frequencies from −200 MHz of the reference frequency to the reference frequency), a fourth fraction of the total bandwidth (e.g., frequencies from +200 MHz to +400 MHz of the reference frequency), and so on, iteratively covering a different subset of the total bandwidth. Accordingly, the digital pre-distortion applied by the processor 355 (e.g., as described below) may be adjusted based at least in part on the different subset and thus increase in accuracy over time, but while the processor 355 still conserves power and reduces convergence time.

Additionally, or alternatively, the subset of the total bandwidth, covered by the local oscillator 330 and the ADC 345, may include a pattern of fractions of the total bandwidth. For example, the total bandwidth may be divided into a plurality of fractions such that the local oscillator 330 and the ADC 345 may cover every other fraction (e.g., a first fraction, a third fraction, and so on, or a second fraction, a fourth fraction, and so on). In some aspects, the local oscillator 330 and the ADC 345 may cover a different pattern within the modulation bandwidth Bm than outside the modulation bandwidth Bm (but still in the total bandwidth Bd). For example, the local oscillator 330 and the ADC 345 may cover every fraction within the modulation bandwidth Bm, but every other fraction of neighboring bands within the total bandwidth Bd but outside the modulation bandwidth Bm. For example, if the modulation bandwidth Bm includes three 400 MHz fractions from −600 MHz to +600 MHz of a reference frequency, and the total bandwidth Bd includes six 400 MHz fractions from −1800 MHz to −600 MHz of the reference frequency and from +600 MHz to +1800 MHz of the reference frequency, the local oscillator 330 and the ADC 345 may cover only a first fraction (e.g., from −1800 MHz to −1400 MHz of the reference frequency), a third fraction (e.g., from −1000 MHz to −600 MHz of the reference frequency), and a fifth fraction (e.g., from +1000 MHz to +1400 MHz of the reference frequency) of the total bandwidth Bd that are outside the modulation bandwidth Bm but also cover all three fractions of the modulation bandwidth Bm.

In some aspects, a transceiver chain may use outputs that represent a subset of the total bandwidth even when using a local oscillator that covers the total bandwidth and/or an ADC configured to sample at a rate corresponding to the total bandwidth. Accordingly, a processor of that transceiver chain may still conserve power and reduce convergence time even when the local oscillator and/or the ADC consume additional power to cover the total bandwidth.

The processor 355 may further determine a digital pre-distortion to apply to new signals, before input to the DAC 310, using a least squares regression. For example, the least squares regression may use a kernel matrix based at least in part on the signal 305 and the determined error between the signal 305 and the amplified analog signal received by the downconverter 335. In some aspects, the kernel matrix may be rotated, filtered, and/or downsampled before undergoing FFT for use in the least squares regression. For example, the processor 355 may rotate, filter, and/or downsample the kernel matrix based at least in part on the subset of the total bandwidth represented by outputs from the ADC 345.

In some aspects, the processor 355 may perform the least squares regression at a sub-rate corresponding to the first fraction of the total bandwidth. For example, the processor 355 may operate at a sampling rate corresponding to the first fraction (e.g., at a clock rate proportional to Ds/N, where Ds is the sampling rate corresponding to the total bandwidth). As a result, the processor 355 may conserve power as compared with operating at a sampling rate corresponding to the total bandwidth Bd.

In some aspects, a transceiver chain may perform least squares regressions at a sub-rate even when using a local oscillator that covers the total bandwidth and/or an ADC configured to sample at a rate corresponding to the total bandwidth. Accordingly, a processor of that transceiver chain may still conserve power even when the local oscillator and/or the ADC consume additional power to cover the total bandwidth.

The digital pre-distortion applied to new signals (e.g., as described below in connection with FIG. 5) may reduce noise within the modulation bandwidth Bm caused by non-linearity of the amplifier 320 when the digital pre-distortion is applied at a rate equal to the modulation bandwidth. For example, the processor 355 may apply the digital pre-distortion to portions of the new signals corresponding to the modulation bandwidth Bm in analog. In some aspects, the digital pre-distortion applied to new signals may further reduce leakage outside the modulation bandwidth Bm but within the total bandwidth Bd caused by non-linearity of the amplifier 320 when the digital pre-distortion is applied at a rate greater than the modulation bandwidth. For example, the processor 355 may apply the digital pre-distortion to portions of the new signals corresponding to at least part of the total bandwidth Bd, that is larger than the modulation bandwidth Bm, in analog.

By using techniques as described in connection with FIG. 3, the local oscillator 330 and the ADC 345 may operate according to lower bandwidths. As a result, the local oscillator 330 and the ADC 345 conserve power, and digital pre-distortion can still be applied with high levels of accuracy to reduce noise and/or leakage. Additionally, or alternatively, the processor 355 may operate at a sub-rate proportional to lower bandwidths. As a result, the processor 355 conserves power, and digital pre-distortion can still be applied with high levels of accuracy to reduce noise and/or leakage. Additionally, or alternatively, the processor 355 may perform the least squares regression using a subset of a total bandwidth. As a result, the processor 355 conserves power and operates faster. Additionally, any decreases in accuracy for the digital pre-distortion are usually not significant.

As indicated above, FIG. 3 is provided as an example. Other examples may differ from what is described with respect to FIG. 3.

Figure 4:
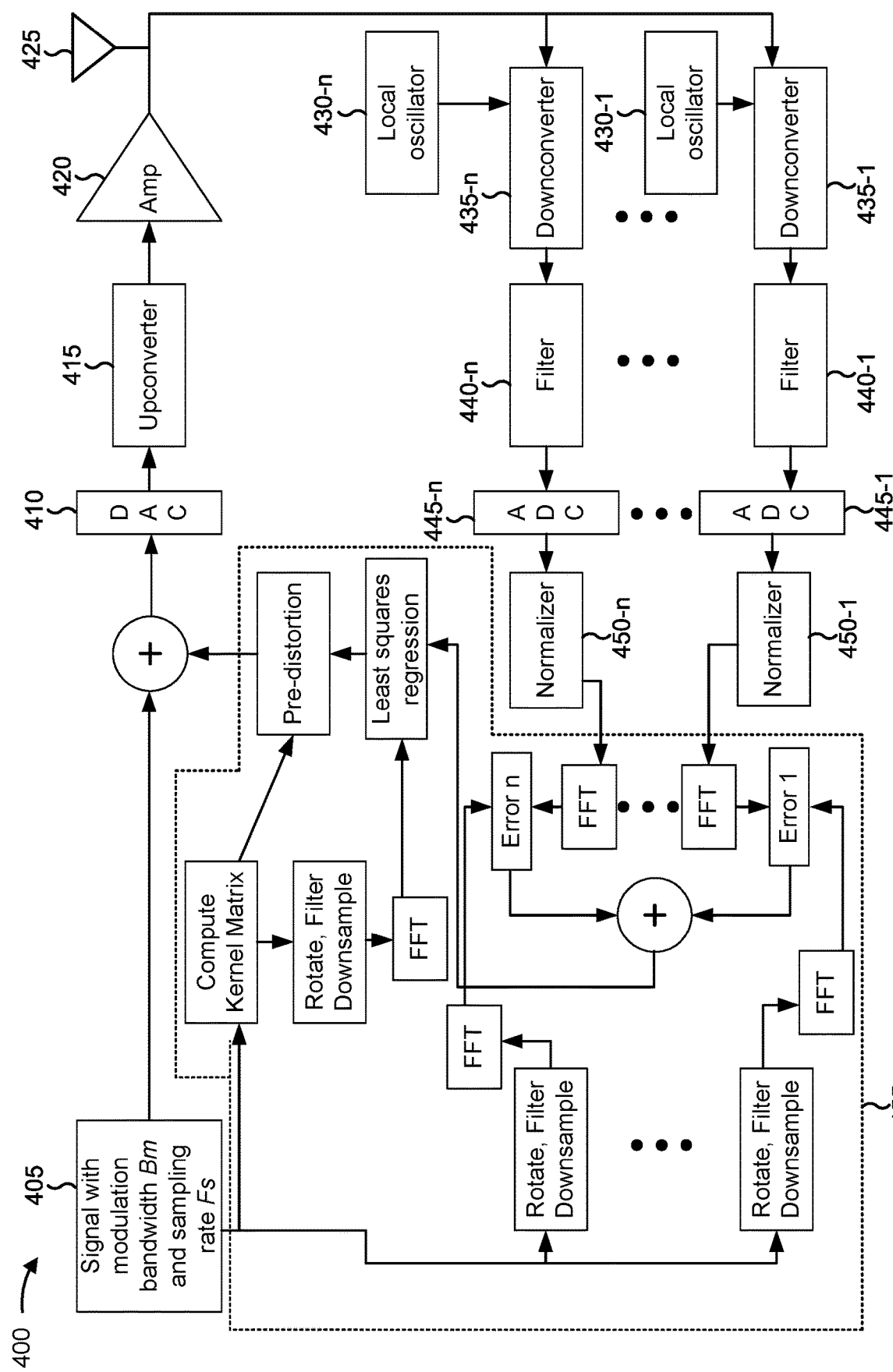

FIG. 4 is a diagram illustrating an example architecture 400 for optimizing 5G fractional bandwidth DPD in a frequency domain, in accordance with the present disclosure. Example 400 may be included in a transceiver chain of a UE (e.g., UE 120) and/or a transceiver chain of a base station (e.g., base station 110).

As shown in FIG. 4, a signal 405 may be modulated using a modulation bandwidth (e.g., represented by Bm) and may have an associated sampling rate (e.g., represented by Fs). For example, the modulation bandwidth Bm may be 2 GHz or higher for mmW communications in 5G. In some aspects, due to leakage into neighboring bands, the signal 405 may be transmitted in a total bandwidth (e.g., represented by Bd) that includes distortions in the neighboring bands. The total bandwidth may be greater than or equal to the modulation bandwidth (e.g., Bd≥Bm). For example, the total bandwidth Bd may be 10 GHz or higher for mmW communications in 5G. Similarly, the total bandwidth may be associated with a sampling rate (e.g., represented by Ds) that is larger than the associated sampling rate (e.g., Ds≥Fs).

The signal 405 may pass through a DAC 410 and be upconverted to RF by an upconverter 415 before being amplified at a power amplifier 420. The power amplifier 420 may amplify an analog signal that is output from the upconverter 415 and is based at least in part on an analog signal output by the DAC 410 and corresponding to the signal 405. Accordingly, an antenna 425 may generate a transmit signal OTA based at least in part on the amplified analog signal from the power amplifier 420.

However, the power amplifier 420 may have non-linearities that introduce distortion into the transmit signal. The distortion may be included in portions of the amplified analog signal corresponding to the modulation bandwidth Bm and/or may include leakages into neighboring bands that are within the total bandwidth Bd. In order to compensate for these non-linearities, a first local oscillator 430-1 (of n local oscillators) may tune a first downconverter 435-1 (of n downconverters) to receive the transmit signal corresponding to the signal 405. The local oscillator 430-1 may be included in a direct conversion receiver or an IF receiver. Although depicted separately from the downconverter 435-1, in some aspects, the local oscillator 430-1 may be at least partially integrated with the downconverter 435-1. In some aspects, the local oscillator 430-1 may be configured to cover a first fraction (e.g., represented by 1/N) of the total bandwidth Bd, such as a 400 MHz fraction of a 3600 MHz total bandwidth. For example, a controller associated with the local oscillator 430-1 may instruct the local oscillator to generate a tuning signal in order to tune the downconverter 435-1 to a central frequency within the first fraction and cover a range above and below the central frequency such that the range comprises the first fraction of the total bandwidth Bd. As a result, the local oscillator 430-1 may conserve power as compared with being configured to cover the total bandwidth Bd.

As further shown in FIG. 4, the downconverter 435-1 may provide input to a first ADC 445-1 (of n ADCs), where the input is based at least in part on the received transmit signal (corresponding to the signal 405). In some aspects, the input is further filtered by a first filter 440-1 (of n filters) before being provided to the ADC 445-1. The ADC 445-1 (and optionally the filter 440-1) may sample at the first fraction of the total bandwidth and output a first digital signal based at least in part on the input. For example, the ADC 445-1 (and optionally the downconverter 435-1 and/or the filter 440-1) may be configured to operate at a sampling rate corresponding to the first fraction (e.g., at a clock rate proportional to Ds/N, where Ds is the sampling rate corresponding to the total bandwidth). As a result, the ADC 445-1 (and optionally the downconverter 435-1 and/or the filter 440-1) may conserve power as compared with operating at a sampling rate corresponding to the total bandwidth Bd.

Accordingly, a processor 455 may determine an error (e.g., "Error 1" in FIG. 4) associated with the signal 405 based at least in part on the first digital signal output by the ADC 445-1. In some aspects, the first digital signal is further normalized by a normalizer 450-1 (of n normalizers) before being provided to the processor 455.

As shown in FIG. 4, the processor 455 may determine the error based at least in part on a band error computed in a frequency domain (e.g., as described below in connection with FIG. 5). Accordingly, the processor 455 may perform an FFT and/or another transform from a time domain into the frequency domain on the first digital signal output by the ADC 445-1 and on the signal 405. In some aspects, the signal 405 may be rotated, filtered, and/or downsampled before undergoing FFT. For example, the processor 455 may rotate, filter, and/or downsample the signal 405 based at least in part on the first fraction.

Accordingly, the processor 455 may determine the error (e.g., "Error 1" in FIG. 4), in the frequency domain, based at least in part on the signal 405 and the first digital signal output by the ADC 445-1. In example 400, n−1 additional local oscillators may be configured (e.g., by the controller) to cover additional fractions of the total bandwidth. For example, the additional local oscillators may generate additional tuning signals in order to tune the additional downconverters to cover different ranges that comprise the additional fractions of the total bandwidth Bd. Accordingly, n−1 additional ADCs may output additional digital signals based at least in part on sampling at the additional fractions of the total bandwidth. Further, the processor 455 may determine additional errors (e.g., up to "Error n" in FIG. 4) based at least in part on the additional digital signals output by the additional ADCs. Thus, the processor 455 may sum the errors (e.g., shown using a "+" in FIG. 4) based at least in part on the digital signals output by ADCs 445-1 to 445-*n* using input from downconverters 435-1 to 435-*n*.

In some aspects, the local oscillators 430-1 to 430-*n* may be configured such that the total bandwidth is covered. Accordingly, the processor 455 may determine the error based at least in part on outputs from the ADCs 445-1 to 445-*n* that represent the total bandwidth. As an alternative, the local oscillators 430-1 to 430-*n* may be configured such that a portion of the total bandwidth is covered. For example, the local oscillators 430-1 to 430-*n* may be configured to cover a first fraction of the total bandwidth (e.g., frequencies from −600 MHz to −200 MHz of a reference frequency) and a second fraction of the total bandwidth (e.g., frequencies from +200 MHz to +600 MHz of the reference frequency) but not a third fraction of the total bandwidth (e.g., frequencies from −200 MHz to +200 MHz of the reference frequency). Accordingly, the processor 455 may determine the error based at least in part on outputs from the ADCs 445-1 to 445-*n* that represent a subset of the total bandwidth. As a result, the processor 455 may conserve power and reduce convergence time when running a least squares regression (e.g., as described below) as compared with using outputs from the ADCs 445-1 to 445-*n* that represent the total bandwidth.

In some aspects, the subset of the total bandwidth covered by the local oscillators 430-1 to 430-*n* and the ADCs 445-1 to 445-*n* may vary. For example, the local oscillators 430-1 to 430-*n* and the ADCs 445-1 to 445-*n* may cover a first fraction of the total bandwidth (e.g., frequencies from −400 MHz to −200 MHz of a reference frequency), a second fraction of the total bandwidth (e.g., frequencies from the reference frequency to +200 MHz of the reference frequency), and so on, respectively, covering the subset of the total bandwidth, for a first period of time and/or a first quantity of clock cycles. Thereafter, the local oscillators 430-1 to 430-*n* and the ADCs 445-1 to 445-*n* may cover a third fraction of the total bandwidth (e.g., frequencies from −200 MHz of the reference frequency to the reference frequency), a fourth fraction of the total bandwidth (e.g., frequencies from +200 MHz to +400 MHz of the reference frequency), and so on, respectively, covering a different subset of the total bandwidth. Accordingly, the digital pre-distortion applied by the processor 455 (e.g., as described below) may be adjusted based at least in part on the different subset and thus increase in accuracy over time, but while the processor 455 still conserves power and reduces convergence time.

Additionally, or alternatively, the subset of the total bandwidth, covered by the local oscillators 430-1 to 430-*n* and the ADCs 445-1 to 445-*n*, may include a pattern of fractions of the total bandwidth. For example, the total bandwidth may be divided into a plurality of fractions such that the local oscillators 430-1 to 430-*n* and the ADCs 445-1 to 445-*n* may cover every other fraction (e.g., a first fraction, a third fraction, and so on, or a second fraction, a fourth fraction, and so on). In some aspects, the local oscillators 430-1 to 430-*n* and the ADCs 445-1 to 445-*n* may cover a different pattern within the modulation bandwidth Bm than outside the modulation bandwidth Bm (but still in the total bandwidth BO. For example, the local oscillators 430-1 to 430-*n* and the ADCs 445-1 to 445-*n* may cover every fraction within the modulation bandwidth Bm, but every other fraction of neighboring bands within the total bandwidth Bd but outside the modulation bandwidth Bm. For example, if the modulation bandwidth Bm includes three 400 MHz fractions from −600 MHz to +600 MHz of a reference frequency, and the total bandwidth Bd includes six 400 MHz fractions from −1800 MHz to −600 MHz of the reference frequency and from +600 MHz to +1800 MHz of the reference frequency, the local oscillators 430-1 to 430-*n* and the ADCs 445-1 to 445-*n* may cover only a first fraction (e.g., from −1800 MHz to −1400 MHz of the reference frequency), a third fraction (e.g., from −1000 MHz to −600 MHz of the reference frequency), and a fifth fraction (e.g., from +1000 MHz to +1400 MHz of the reference frequency) of the total bandwidth Bd that are outside the modulation bandwidth Bm but also cover all three fractions of the modulation bandwidth Bm.

In some aspects, a transceiver chain may use outputs that represent a subset of the total bandwidth even when using a local oscillator that covers the total bandwidth and/or an ADC configured to sample at a rate corresponding to the total bandwidth. Accordingly, a processor of that transceiver chain may still conserve power and reduce convergence time even when the local oscillator and/or the ADC consume additional power to cover the total bandwidth.

The processor 455 may further determine a digital pre-distortion to apply to new signals, before input to the DAC 410, using a least squares regression. For example, the least squares regression may use a kernel matrix based at least in part on the signal 405 and the determined error between the signal 405 and the amplified analog signal received by the downconverters 435-1 to 435-*n*. In some aspects, the kernel matrix may be rotated, filtered, and/or downsampled before undergoing FFT for use in the least squares regression. For example, the processor 455 may rotate, filter, and/or downsample the kernel matrix based at least in part on the subset of the total bandwidth represented by outputs from the ADCs 445-1 to 445-*n*.

In some aspects, the processor 455 may perform the least squares regression at a sub-rate corresponding to the first fraction of the total bandwidth. For example, the processor 455 may operate at a sampling rate corresponding to the first fraction (e.g., at a clock rate proportional to Ds/N, where Ds is the sampling rate corresponding to the total bandwidth). As a result, the processor 455 may conserve power as compared with operating at a sampling rate corresponding to the total bandwidth Bd.

In some aspects, a transceiver chain may perform least squares regressions at a sub-rate even when using a local oscillator that covers the total bandwidth and/or an ADC configured to sample at a rate corresponding to the total bandwidth. Accordingly, a processor of that transceiver chain may still conserve power even when the local oscillator and/or the ADC consume additional power to cover the total bandwidth.

The digital pre-distortion applied to new signals (e.g., as described below in connection with FIG. 5) may reduce noise within the modulation bandwidth Bm caused by non-linearity of the amplifier 420 when the digital pre-distortion is applied at a rate equal to the modulation bandwidth. For example, the processor 455 may apply the digital pre-distortion to portions of the new signals corresponding to the modulation bandwidth Bm in analog. In some aspects, the digital pre-distortion applied to new signals may further reduce leakage outside the modulation bandwidth Bm but within the total bandwidth Bd caused by non-linearity of the amplifier 420 when the digital pre-distortion is applied at a rate greater than the modulation bandwidth. For example, the processor 455 may apply the digital pre-distortion to portions of the new signals corresponding to at least part of the total bandwidth Bd, that is larger than the modulation bandwidth Bm, in analog.

By using techniques as described in connection with FIG. 4, the local oscillators 430-1 to 430-$n$ and the ADCs 445-1 to 445-$n$ may operate according to lower bandwidths. As a result, the local oscillators 430-1 to 430-$n$ and the ADCs 445-1 to 445-$n$ conserve power, and digital pre-distortion can still be applied with high levels of accuracy to reduce noise and/or leakage. Additionally, or alternatively, the processor 455 may operate at a sub-rate proportional to lower bandwidths. As a result, the processor 455 conserves power, and digital pre-distortion can still be applied with high levels of accuracy to reduce noise and/or leakage. Additionally, or alternatively, the processor 455 may perform the least squares regression using a subset of a total bandwidth. As a result, the processor 455 conserves power and operates faster. Additionally, any decreases in accuracy for the digital pre-distortion are usually not significant.

As indicated above, FIG. 4 is provided as an example. Other examples may differ from what is described with respect to FIG. 4.

Figure 5:
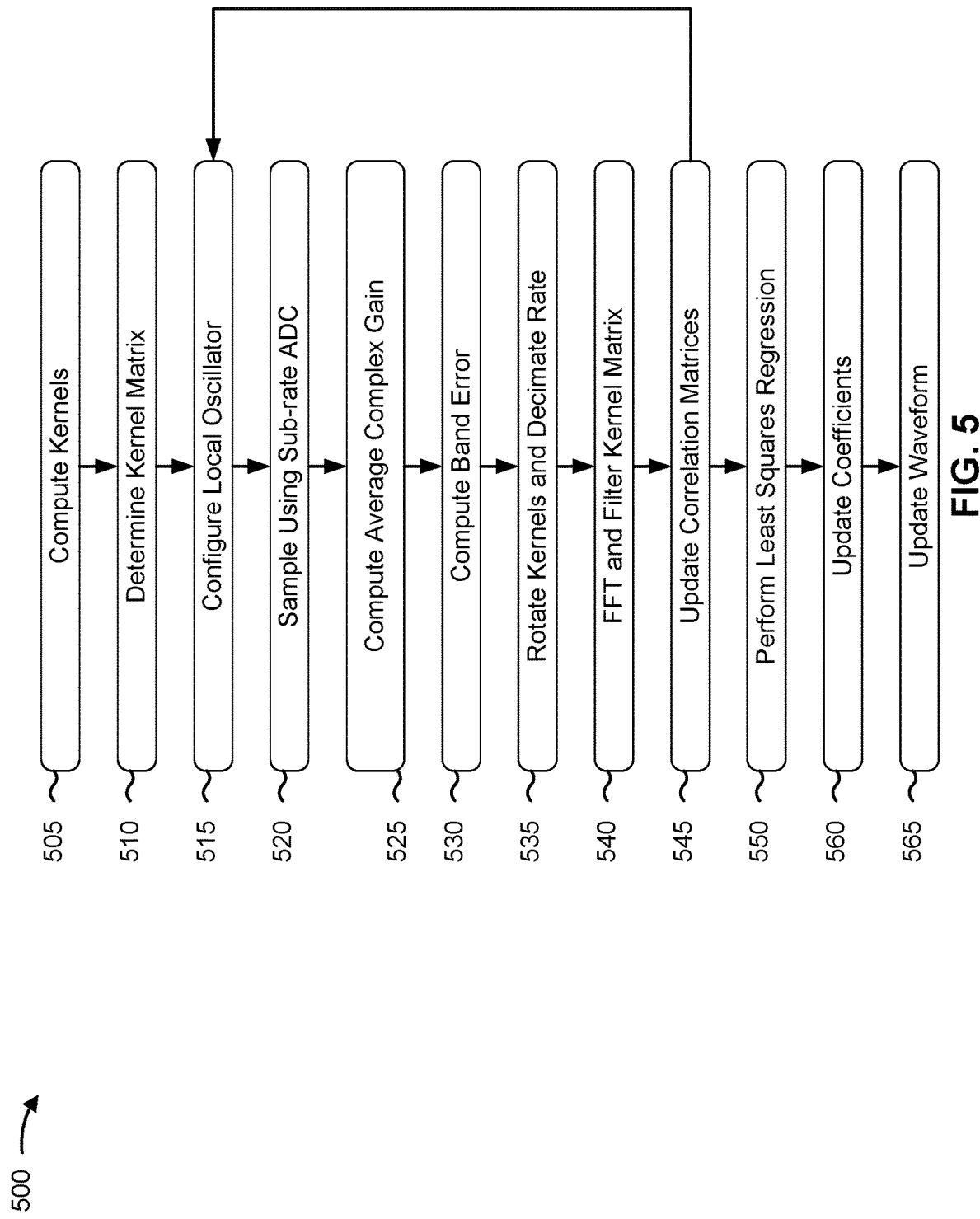
FIG. 5 is a diagram illustrating an example process for optimizing 5G fractional bandwidth DPD in a frequency domain, in accordance with the present disclosure.

FIG. 5 is a diagram illustrating an example process 500 for optimizing 5G fractional bandwidth DPD in a frequency domain, in accordance with the present disclosure. Example 500 may be performed by a processor in a transceiver chain (e.g., processor 355 of FIG. 3 and/or processor 455 of FIG. 4) of a UE (e.g., UE 120) and/or a transceiver chain of a base station (e.g., base station 110).

As shown in FIG. 5, the processor may compute kernels associated with a digital signal (block 505). For example, the processor may compute $$y_1 = x(:,n),$$

$$y_2 = x(:,n)|x(:,n)|^2,$$

$$y_3 = x(:,n)|x(:,n)|^4,$$

and so on. In this example, the kernels are represented by $y_1$, $y_2$, $y_3$, and any other higher-order kernels computed by the processor. The kernels are represented as non-linear functions x of time (represented by n) and correspond to the digital signal (e.g., to be transmitted after conversion to an analog signal and amplified by a power amplifier).

As further shown in FIG. 5, the processor may determine a kernel matrix based at least in part on the kernels (block 510). For example, the processor may determine $$\phi_t = [y_1 y_2 y_3 \ldots y_k],$$

where $\phi_t$ represents the kernel matrix and includes the kernels $y_1, y_2, y_3, \ldots y_k$ as columns within the matrix.

As further shown in FIG. 5, the processor may configure a local oscillator to cover a fraction of a total bandwidth associated with the digital signal (block 515). For example, the processor may configure the local oscillator to generate a tuning signal according to $e^{(i(\omega_c + \Delta)t)}$, where $\omega_c$ represents a reference frequency, $\Delta$ represents a range around the reference frequency that comprises the fraction of the total bandwidth, and t represents time.

Accordingly, as shown in FIG. 5, the processor may configure an ADC to sample input, from a downconverter tuned by the local oscillator, at a sub-rate corresponding to the first fraction (block 520). For example, the processor may configure the ADC to output a digital signal y(:, m)= $\mathcal{L}\{PA(x(:, m))\}$, where x(:, m) represents a non-linear function of time (represented by m) that the downconverter received from the power amplifier (represented by PA), and where $\mathcal{L}$ represents an analog filter.

Additionally, as further shown in FIG. 5, the processor may compute an average complex gain associated with the digital signal y(:, m) (block 525). For example, the processor may compute $$G = \frac{\text{Mean}[y_{ib}(:,m) \cdot x_{ib}^*(:,m)]}{\text{Mean}[x_{ib}(:,m) \cdot x_{ib}^*(:,m)]},$$

where G represents the average complex gain, $y_{ib}(:, m)$ represents the digital signal output by the ADC as a non-linear function of time (represented by m), $x_{ib}(:, m)$ represents the digital signal before amplification by the power amplifier as a non-linear function of time (represented by m), and $x_{ib}^*(:, m)$ is the conjugate of $x_{ib}(:, m)$. In some aspects, the processor may refrain from computing the average complex gain for digital signals sampled outside a modulation bandwidth Bm but inside a total bandwidth Bd.

As shown in FIG. 5, the processor may determine a band error based at least in the digital signal output by the ADC and the digital signal before amplification by the power amplifier (block 530). The processor may determine the error in a frequency domain. For example, the processor may determine $$E = \mathcal{H} \cdot \mathcal{F}(y_r)/G - \mathcal{H} \cdot \mathcal{F}(x_r),$$

where E represents the error, $\mathcal{H}$ represents a bandlimiting boxcar filter, $\mathcal{F}(y_r)$ represents an FFT of the digital signal output by the ADC (represented by $y_r$), G represents the average complex gain, and $\mathcal{F}(x_r)$ represents an FFT of the digital signal before amplification by the power amplifier (represented by $x_r$).

Accordingly, the processor may rotate the kernels and decimate a rate associated with the kernels based at least in part on the first fraction (block 535). For example, the processor may compute $$\phi_{BB} = \mathcal{D}(\mathcal{R}(\phi_t)),$$

where $\phi_{BB}$ represents the rotated and decimated kernel matrix, $\phi_t$ represents the kernel matrix, $\mathcal{D}$ represents an anti-alias and decimate function, and $\mathcal{R}$ represents a rotation. In some aspects, $\mathcal{R}(y) = y(n) * e^{(i(\Delta(n))t)}$, where y(n) represents a kernel that is rotated by $\mathcal{R}$, and $\Delta$ represents a phase associated with the rotation.

As further shown in FIG. 5, the processor may filter the kernel matrix and perform an FFT (block 540) such that the error, which was determined in the frequency domain, can be used. For example, the processor may compute $$\phi = \mathcal{H} \cdot \mathcal{F}(\phi_{BB}),$$

where $\phi_{BB}$ represents the rotated and decimated kernel matrix, $\phi$ represents the filtered kernel matrix in the frequency domain, $\mathcal{H}$ represents a bandlimiting boxcar filter, and $\mathcal{F}(\phi_{BB})$ represents an FFT of the rotated and decimated kernel matrix.

Accordingly, the processor may update correlation matrices associated with the digital signal output by the ADC and the digital signal before amplification by the power amplifier (block 545). For example, the processor may determine $$Q = Q + \phi^H \phi \text{ and}$$

$$\rho = \rho + \phi^H E,$$

where Q and ρ represent the correlation matrices, ϕ represents the filtered kernel matrix, $\phi^H$ represents the Hermitian transpose of the filtered kernel matrix, and E represents the error.

In some aspects, as shown in FIG. 5, the operations represented by blocks 515, 520, 525, 530, 535, 540, and/or 545 may be iterated. For example, as described above in connection with FIG. 3, the processor may shift the local oscillator and the ADC over time such that the total bandwidth (or a subset thereof) is covered incrementally across a plurality of fractions. Alternatively, as described above in connection with FIG. 4, the processor may use a plurality of local oscillators and ADCs such that the processor iterates the operations represented by blocks 515, 520, 525, 530, 535, 540, and/or 545 for each pair including one local oscillator and one ADC in order to cover the total bandwidth (or a subset thereof).

Thus, as further shown in FIG. 5, the processor may perform a least squares regression based at least in part on the correlation matrices (block 550). For example, the processor may determine $$\Delta a = Q^{-1} \rho,$$

where Δa represents a change to a coefficient matrix associated with digital pre-distortion, $Q^{-1}$ represents a quasi-inverse of correlation matrix Q (updated according to block 545 described above), and ρ represents the other correlation matrix (updated according to block 545 described above).

Accordingly, as shown in FIG. 5, the processor may update coefficients associated with the digital pre-distortion (block 560). For example, the processor may calculate $$a = a - \beta \cdot \Delta a,$$

where a represents the coefficient matrix associated with digital pre-distortion, Δa represents the change to the coefficient matrix, and β represents a scaling factor.

Thus, as shown in FIG. 5, the processor may update a new digital signal for transmission (block 565). For example, the processor may apply digital pre-distortion based at least in part on the updated coefficients such that $$x_{dpd} = x + \phi_f \cdot a,$$

where a represents the coefficient matrix associated with digital pre-distortion (updated according to block 560 described above), $\phi_f$ represents the kernel matrix, x represents the new digital signal for transmission, and $x_{dpd}$ represents the new digital signal after digital pre-distortion.

As indicated above, FIG. 5 is provided as an example. Other examples may differ from what is described with respect to FIG. 5.

Figure 6:
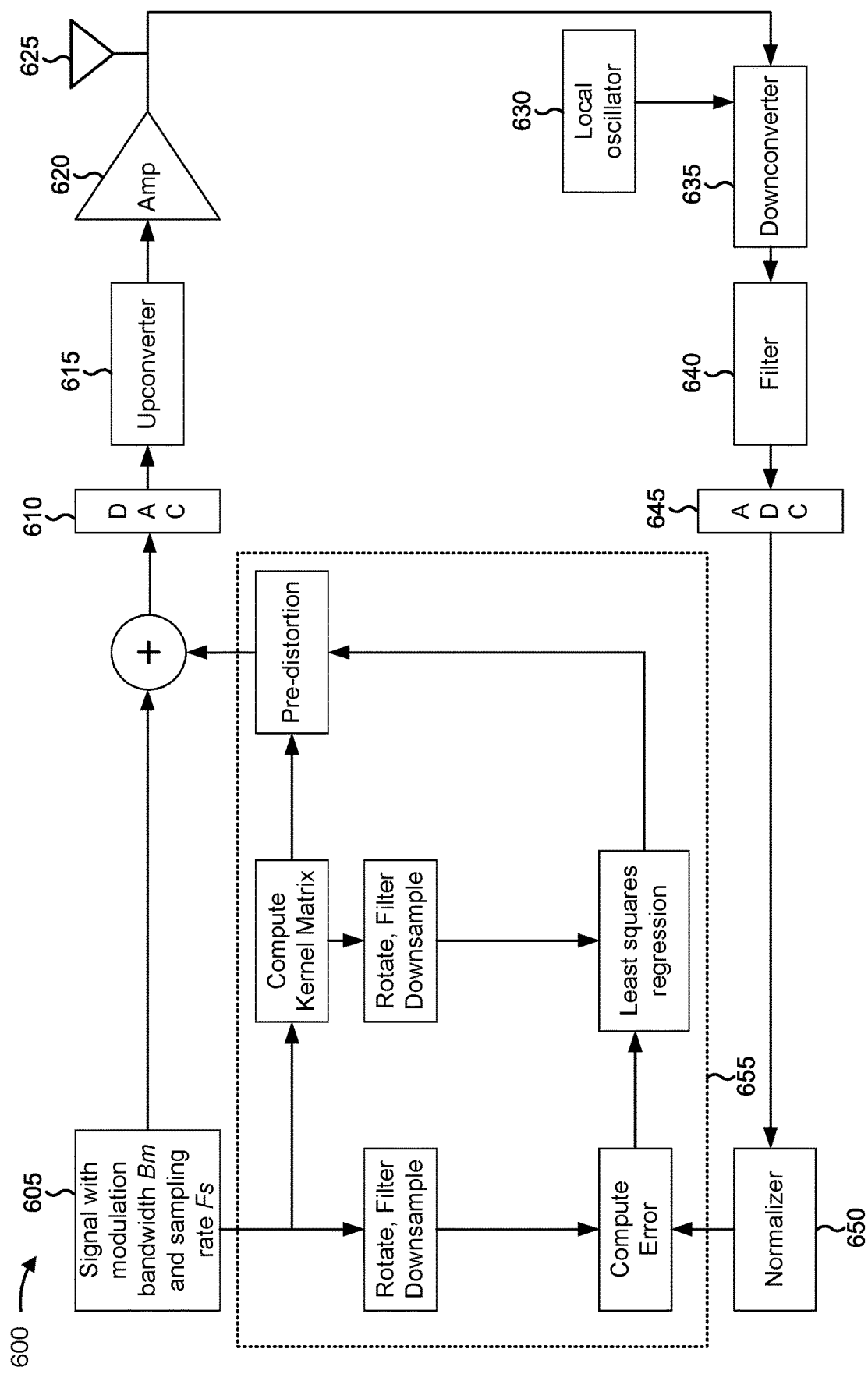
FIGS. 6 and 7 are diagrams illustrating example architectures for optimizing 5G fractional bandwidth DPD in a time domain, in accordance with the present disclosure.

FIG. 6 is a diagram illustrating an example architecture 600 for optimizing 5G fractional bandwidth DPD in a time domain, in accordance with the present disclosure. Example 600 may be included in a transceiver chain of a UE (e.g., UE 120) and/or a transceiver chain of a base station (e.g., base station 110).

As shown in FIG. 6, a signal 605 may be modulated using a modulation bandwidth (e.g., represented by Bm) and may have an associated sampling rate (e.g., represented by Fs). For example, the modulation bandwidth Bm may be 2 GHz or higher for mmW communications in 5G. In some aspects, due to leakage into neighboring bands, the signal 605 may be transmitted in a total bandwidth (e.g., represented by Bd) that includes distortions in the neighboring bands. The total bandwidth may be greater than or equal to the modulation bandwidth (e.g., Bd≥Bm). For example, the total bandwidth Bd may be 10 GHz or higher for mmW communications in 5G. Similarly, the total bandwidth may be associated with a sampling rate (e.g., represented by Ds) that is larger than the associated sampling rate (e.g., Ds≥Fs).

The signal 605 may pass through a DAC 610 and be upconverted to RF by an upconverter 615 before being amplified at a power amplifier 620. The power amplifier 620 may amplify an analog signal that is output from the upconverter 615 and is based at least in part on an analog signal output by the DAC 610 and corresponding to the signal 605. Accordingly, an antenna 625 may generate a transmit signal OTA based at least in part on the amplified analog signal from the power amplifier 620.

However, the power amplifier 620 may have non-linearities that introduce distortion into the transmit signal. The distortion may be included in portions of the amplified analog signal corresponding to the modulation bandwidth Bm and/or may include leakages into neighboring bands that are within the total bandwidth Bd. In order to compensate for these non-linearities, a local oscillator 630 may tune a downconverter 635 to receive the transmit signal corresponding to the signal 605. The local oscillator 630 may be included in a direct conversion receiver or an IF receiver. Although depicted separately from the downconverter 635, in some aspects, the local oscillator 630 may be at least partially integrated with the downconverter 635. In some aspects, the local oscillator 630 may be configured to cover a first fraction (e.g., represented by 1/N) of the total bandwidth Bd, such as a 400 MHz fraction of a 3600 MHz total bandwidth. For example, a controller associated with the local oscillator 630 may instruct the local oscillator to generate a tuning signal in order to tune the downconverter 635 to a central frequency within the first fraction and cover a range above and below the central frequency such that the range comprises the first fraction of the total bandwidth Bd. As a result, the local oscillator 630 may conserve power as compared with being configured to cover the total bandwidth Bd.

As further shown in FIG. 6, the downconverter 635 may provide input to an ADC 645, where the input is based at least in part on the received transmit signal (corresponding to the signal 605). In some aspects, the input is further filtered by a filter 640 before being provided to the ADC 645. The ADC 645 (and optionally the filter 640) may sample at the first fraction of the total bandwidth and output a digital signal based at least in part on the input. For example, the ADC 645 (and optionally the downconverter 635 and/or the filter 640) may be configured to operate at a sampling rate corresponding to the first fraction (e.g., at a clock rate proportional to Ds/N, where Ds is the sampling rate corresponding to the total bandwidth). As a result, the ADC 645 (and optionally the downconverter 635 and/or the filter 640) may conserve power as compared with operating at a sampling rate corresponding to the total bandwidth Bd.

Accordingly, a processor 655 may determine an error associated with the signal 605 based at least in part on the digital signal output by the ADC 645. In some aspects, the digital signal is further normalized by a normalizer 650 before being provided to the processor 655.

As shown in FIG. 6, the processor 655 may determine the error based at least in part on a band error computed in a time domain. Accordingly, the processor 655 may refrain from applying an FFT and/or another transform to the digital signal output by the ADC 645 and to the signal 605. In some aspects, the signal 605 may be rotated, filtered, and/or downsampled. For example, the processor 655 may rotate, filter, and/or downsample the signal 605 based at least in part on the first fraction.

Accordingly, the processor 655 may determine the error, in the time domain, based at least in part on the signal 605 and the digital signal output by the ADC 645. In some aspects, the local oscillator 630 may be configured (e.g., by the controller) to shift to a second fraction of the total bandwidth. For example, the local oscillator 630 may generate a different tuning signal in order to tune the downconverter 635 to a central frequency within the second fraction and cover a range above and below the central frequency such that the range comprises the second fraction of the total bandwidth Bd. Accordingly, the ADC 645 may output a second digital signal based at least in part on sampling at the second fraction of the total bandwidth. Further, the processor 655 may determine the error based at least in part on the second digital signal output by the ADC 645. Thus, the processor 655 may determine the error iteratively (e.g., as described below in connection with FIG. 8) as the local oscillator 630 shifts to different fractions of the total bandwidth.

In some aspects, the local oscillator 630 may shift over time such that the total bandwidth is covered incrementally. Accordingly, the processor 655 may determine the error based at least in part on outputs from the ADC 645 that represent the total bandwidth. As an alternative, the local oscillator 630 may shift over time such that a portion of the total bandwidth is covered. For example, the local oscillator 630 may be configured to cover a first fraction of the total bandwidth (e.g., frequencies from −600 MHz to −200 MHz of a reference frequency), shift to cover a second fraction of the total bandwidth (e.g., frequencies from +200 MHz to +600 MHz of the reference frequency), and not cover a third fraction of the total bandwidth (e.g., frequencies from −200 MHz to +200 MHz of the reference frequency). Accordingly, the processor 655 may determine the error based at least in part on outputs from the ADC 645 that represent a subset of the total bandwidth. As a result, the processor 655 may conserve power and reduce convergence time when running a least squares regression (e.g., as described below) as compared with using outputs from the ADC 645 that represent the total bandwidth.

In some aspects, the subset of the total bandwidth covered by the local oscillator 630 and the ADC 645 may vary (e.g., as described above in connection with FIG. 3). Additionally, or alternatively, the subset of the total bandwidth, covered by the local oscillator 630 and the ADC 645, may include a pattern of fractions of the total bandwidth (e.g., as described above in connection with FIG. 3).

In some aspects, a transceiver chain may use outputs that represent a subset of the total bandwidth even when using a local oscillator that covers the total bandwidth and/or an ADC configured to sample at a rate corresponding to the total bandwidth. Accordingly, a processor of that transceiver chain may still conserve power and reduce convergence time even when the local oscillator and/or the ADC consume additional power to cover the total bandwidth.

The processor 655 may further determine a digital pre-distortion to apply to new signals, before input to the DAC 610, using a least squares regression. For example, the least squares regression may use a kernel matrix based at least in part on the signal 605 and the determined error between the signal 605 and the amplified analog signal received by the downconverter 635. In some aspects, the kernel matrix may be rotated, filtered, and/or downsampled before being used in the least squares regression. For example, the processor 655 may rotate, filter, and/or downsample the kernel matrix based at least in part on the subset of the total bandwidth represented by outputs from the ADC 645.

In some aspects, the processor 655 may perform the least squares regression at a sub-rate corresponding to the first fraction of the total bandwidth. For example, the processor 655 may operate at a sampling rate corresponding to the first fraction (e.g., at a clock rate proportional to Ds/N, where Ds is the sampling rate corresponding to the total bandwidth). As a result, the processor 655 may conserve power as compared with operating at a sampling rate corresponding to the total bandwidth Bd.

In some aspects, a transceiver chain may perform least squares regressions at a sub-rate even when using a local oscillator that covers the total bandwidth and/or an ADC configured to sample at a rate corresponding to the total bandwidth. Accordingly, a processor of that transceiver chain may still conserve power even when the local oscillator and/or the ADC consume additional power to cover the total bandwidth.

The digital pre-distortion applied to new signals (e.g., as described below in connection with FIG. 8) may reduce noise within the modulation bandwidth Bm caused by non-linearity of the amplifier 620 when the digital pre-distortion is applied at a rate equal to the modulation bandwidth. For example, the processor 655 may apply the digital pre-distortion to portions of the new signals corresponding to the modulation bandwidth Bm in analog. In some aspects, the digital pre-distortion applied to new signals may further reduce leakage outside the modulation bandwidth Bm but within the total bandwidth Bd caused by non-linearity of the amplifier 620 when the digital pre-distortion is applied at a rate greater than the modulation bandwidth. For example, the processor 655 may apply the digital pre-distortion to portions of the new signals corresponding to at least part of the total bandwidth Bd, that is larger than the modulation bandwidth Bm, in analog.

By using techniques as described in connection with FIG. 6, the local oscillator 630 and the ADC 645 may operate according to lower bandwidths. As a result, the local oscillator 630 and the ADC 645 conserve power, and digital pre-distortion can still be applied with high levels of accuracy to reduce noise and/or leakage. Additionally, or alternatively, the processor 655 may operate at a sub-rate proportional to lower bandwidths. As a result, the processor 655 conserves power, and digital pre-distortion can still be applied with high levels of accuracy to reduce noise and/or leakage. Additionally, or alternatively, the processor 655 may perform the least squares regression using a subset of a total bandwidth. As a result, the processor 655 conserves power and operates faster. Additionally, any decreases in accuracy for the digital pre-distortion are usually not significant.

As indicated above, FIG. 6 is provided as an example. Other examples may differ from what is described with respect to FIG. 6.

Figure 7:
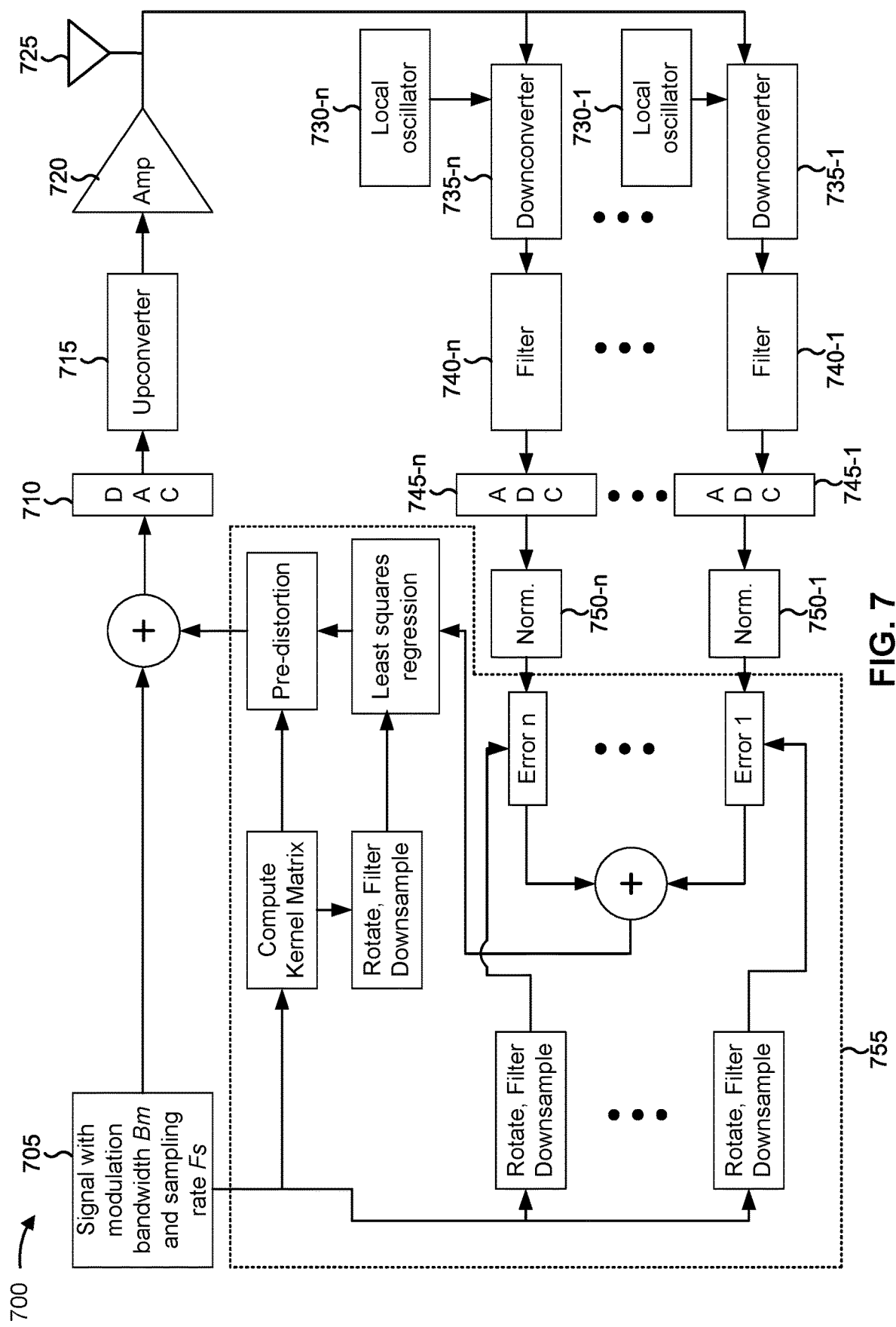

FIG. 7 is a diagram illustrating an example architecture 700 for optimizing 5G fractional bandwidth DPD in a time domain, in accordance with the present disclosure. Example 700 may be included in a transceiver chain of a UE (e.g., UE 120) and/or a transceiver chain of a base station (e.g., base station 110).

As shown in FIG. 7, a signal 705 may be modulated using a modulation bandwidth (e.g., represented by Bm) and may have an associated sampling rate (e.g., represented by Fs). For example, the modulation bandwidth Bm may be 2 GHz or higher for mmW communications in 5G. In some aspects, due to leakage into neighboring bands, the signal 705 may be transmitted in a total bandwidth (e.g., represented by Bd) that includes distortions in the neighboring bands. The total bandwidth may be greater than or equal to the modulation bandwidth (e.g., Bd≥Bm). For example, the total bandwidth Bd may be 10 GHz or higher for mmW communications in 5G. Similarly, the total bandwidth may be associated with a sampling rate (e.g., represented by Ds) that is larger than the associated sampling rate (e.g., Ds≥Fs).

The signal 705 may pass through a DAC 710 and be upconverted to RF by an upconverter 715 before being amplified at a power amplifier 720. The power amplifier 720 may amplify an analog signal that is output from the upconverter 715 and is based at least in part on an analog signal output by the DAC 710 and corresponding to the signal 705. Accordingly, an antenna 725 may generate a transmit signal OTA based at least in part on the amplified analog signal from the power amplifier 720.

However, the power amplifier 720 may have non-linearities that introduce distortion into the transmit signal. The distortion may be included in portions of the amplified analog signal corresponding to the modulation bandwidth Bm and/or may include leakages into neighboring bands that are within the total bandwidth Bd. In order to compensate for these non-linearities, a first local oscillator 730-1 (of n local oscillators) may tune a first downconverter 735-1 (of n downconverters) to receive the transmit signal corresponding to the signal 705. The local oscillator 730-1 may be included in a direct conversion receiver or an IF receiver. Although depicted separately from the downconverter 735-1, in some aspects, the local oscillator 730-1 may be at least partially integrated with the downconverter 735-1. In some aspects, the local oscillator 730-1 may be configured to cover a first fraction (e.g., represented by 1/N) of the total bandwidth Bd, such as a 400 MHz fraction of a 3600 MHz total bandwidth. For example, a controller associated with the local oscillator 730-1 may instruct the local oscillator to generate a tuning signal in order to tune the downconverter 735-1 to a central frequency within the first fraction and cover a range above and below the central frequency such that the range comprises the first fraction of the total bandwidth Bd. As a result, the local oscillator 730-1 may conserve power as compared with being configured to cover the total bandwidth Bd.

As further shown in FIG. 7, the downconverter 735-1 may provide input to a first ADC 745-1 (of n ADCs), where the input is based at least in part on the received transmit signal (corresponding to the signal 705). In some aspects, the input is further filtered by a first filter 740-1 (of n filters) before being provided to the ADC 745-1. The ADC 745-1 (and optionally the filter 740-1) may sample at the first fraction of the total bandwidth and output a first digital signal based at least in part on the input. For example, the ADC 745-1 (and optionally the downconverter 735-1 and/or the filter 740-1) may be configured to operate at a sampling rate corresponding to the first fraction (e.g., at a clock rate proportional to Ds/N, where Ds is the sampling rate corresponding to the total bandwidth). As a result, the ADC 745-1 (and optionally the downconverter 735-1 and/or the filter 740-1) may conserve power as compared with operating at a sampling rate corresponding to the total bandwidth Bd.

Accordingly, a processor 755 may determine an error (e.g., "Error 1" in FIG. 7) associated with the signal 705 based at least in part on the first digital signal output by the ADC 745-1. In some aspects, the first digital signal is further normalized by a normalizer 750-1 (of n normalizers) before being provided to the processor 755.

As shown in FIG. 7, the processor 755 may determine the error based at least in part on a band error computed in a time domain (e.g., as described below in connection with FIG. 8). Accordingly, the processor 755 may refrain from applying an FFT and/or another transform from a time domain into the frequency domain to the first digital signal output by the ADC 745-1 and to the signal 705. In some aspects, the signal 705 may be rotated, filtered, and/or downsampled. For example, the processor 755 may rotate, filter, and/or downsample the signal 705 based at least in part on the first fraction.

Accordingly, the processor 755 may determine the error (e.g., "Error 1" in FIG. 7), in the time domain, based at least in part on the signal 705 and the first digital signal output by the ADC 745-1. In example 400, n−1 additional local oscillators may be configured (e.g., by the controller) to cover additional fractions of the total bandwidth. For example, the additional local oscillators may generate additional tuning signals in order to tune the additional downconverters to cover different ranges that comprise the additional fractions of the total bandwidth Bd. Accordingly, n−1 additional ADCs may output additional digital signals based at least in part on sampling at the additional fractions of the total bandwidth. Further, the processor 755 may determine additional errors (e.g., up to "Error n" in FIG. 7) based at least in part on the additional digital signals output by the additional ADCs. Thus, the processor 755 may sum the errors (e.g., shown using a "+" in FIG. 7) based at least in part on the digital signals output by ADCs 745-1 to 745-n using input from downconverters 735-1 to 735-n.

In some aspects, the local oscillators 730-1 to 730-n may be configured such that the total bandwidth is covered. Accordingly, the processor 755 may determine the error based at least in part on outputs from the ADCs 745-1 to 745-n that represent the total bandwidth. As an alternative, the local oscillators 730-1 to 730-n may be configured such that a portion of the total bandwidth is covered. For example, the local oscillators 730-1 to 730-n may be configured to cover a first fraction of the total bandwidth (e.g., frequencies from −600 MHz to −200 MHz of a reference frequency) and a second fraction of the total bandwidth (e.g., frequencies from +200 MHz to +600 MHz of the reference frequency) but not a third fraction of the total bandwidth (e.g., frequencies from −200 MHz to +200 MHz of the reference frequency). Accordingly, the processor 755 may determine the error based at least in part on outputs from the ADCs 745-1 to 745-n that represent a subset of the total bandwidth. As a result, the processor 755 may conserve power and reduce convergence time when running a least squares regression (e.g., as described below) as compared with using outputs from the ADCs 745-1 to 745-n that represent the total bandwidth.

In some aspects, the subset of the total bandwidth covered by the local oscillators 730-1 to 730-n and the ADCs 745-1 to 745-n may vary (e.g., as described above in connection with FIG. 4). Additionally, or alternatively, the subset of the total bandwidth, covered by the local oscillators 430-1 to 430-n and the ADCs 445-1 to 445-n, may include a pattern of fractions of the total bandwidth. (e.g., as described above in connection with FIG. 4).

In some aspects, a transceiver chain may use outputs that represent a subset of the total bandwidth even when using a local oscillator that covers the total bandwidth and/or an ADC configured to sample at a rate corresponding to the total bandwidth. Accordingly, a processor of that transceiver chain may still conserve power and reduce convergence time even when the local oscillator and/or the ADC consume additional power to cover the total bandwidth.

The processor 755 may further determine a digital predistortion to apply to new signals, before input to the DAC 710, using a least squares regression. For example, the least squares regression may use a kernel matrix based at least in part on the signal 705 and the determined error between the signal 705 and the amplified analog signal received by the downconverters 735-1 to 735-n. In some aspects, the kernel matrix may be rotated, filtered, and/or downsampled before undergoing FFT for use in the least squares regression. For example, the processor 755 may rotate, filter, and/or downsample the kernel matrix based at least in part on the subset of the total bandwidth represented by outputs from the ADCs 745-1 to 745-n.

In some aspects, the processor 755 may perform the least squares regression at a sub-rate corresponding to the first fraction of the total bandwidth. For example, the processor 755 may operate at a sampling rate corresponding to the first fraction (e.g., at a clock rate proportional to Ds/N, where Ds is the sampling rate corresponding to the total bandwidth). As a result, the processor 755 may conserve power as compared with operating at a sampling rate corresponding to the total bandwidth Bd.

In some aspects, a transceiver chain may perform least squares regressions at a sub-rate even when using a local oscillator that covers the total bandwidth and/or an ADC configured to sample at a rate corresponding to the total bandwidth. Accordingly, a processor of that transceiver chain may still conserve power even when the local oscillator and/or the ADC consume additional power to cover the total bandwidth.

The digital pre-distortion applied to new signals (e.g., as described below in connection with FIG. 8) may reduce noise within the modulation bandwidth Bm caused by non-linearity of the amplifier 720 when the digital pre-distortion is applied at a rate equal to the modulation bandwidth. For example, the processor 755 may apply the digital pre-distortion to portions of the new signals corresponding to the modulation bandwidth Bm in analog. In some aspects, the digital pre-distortion applied to new signals may further reduce leakage outside the modulation bandwidth Bm but within the total bandwidth Bd caused by non-linearity of the amplifier 720 when the digital pre-distortion is applied at a rate greater than the modulation bandwidth. For example, the processor 755 may apply the digital pre-distortion to portions of the new signals corresponding to at least part of the total bandwidth Bd, that is larger than the modulation bandwidth Bm, in analog.

By using techniques as described in connection with FIG. 7, the local oscillators 730-1 to 730-n and the ADCs 745-1 to 745-n may operate according to lower bandwidths. As a result, the local oscillators 730-1 to 730-n and the ADCs 745-1 to 745-n conserve power, and digital pre-distortion can still be applied with high levels of accuracy to reduce noise and/or leakage. Additionally, or alternatively, the processor 755 may operate at a sub-rate proportional to lower bandwidths. As a result, the processor 755 conserves power, and digital pre-distortion can still be applied with high levels of accuracy to reduce noise and/or leakage. Additionally, or alternatively, the processor 755 may perform the least squares regression using a subset of a total bandwidth. As a result, the processor 755 conserves power and operates faster. Additionally, any decreases in accuracy for the digital pre-distortion are usually not significant.

As indicated above, FIG. 7 is provided as an example. Other examples may differ from what is described with respect to FIG. 7.

Figure 8:
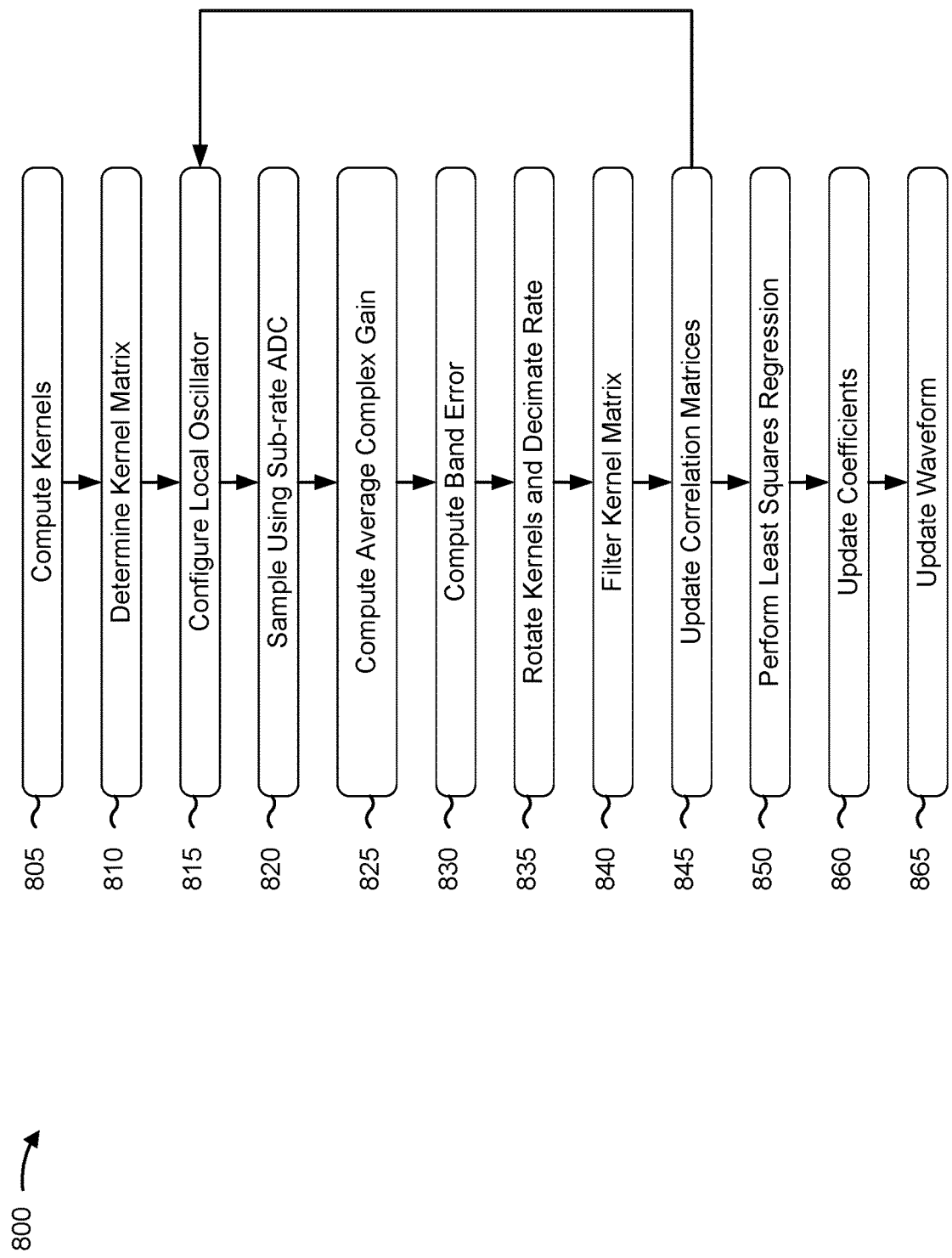
FIG. 8 is a diagram illustrating an example process for optimizing 5G fractional bandwidth DPD in a time domain, in accordance with the present disclosure.

FIG. 8 is a diagram illustrating an example process 800 for optimizing 5G fractional bandwidth DPD in a time domain, in accordance with the present disclosure. Example 800 may be performed by a processor in a transceiver chain (e.g., processor 655 of FIG. 6 and/or processor 755 of FIG. 7) of a UE (e.g., UE 120) and/or a transceiver chain of a base station (e.g., base station 110).

As shown in FIG. 8, the processor may compute kernels associated with a digital signal (block 805). For example, the processor may compute $$y_1 = x(:,n),$$

$$y_2 = x(:,n)|x(:,n)|^2,$$

$$y_3 = x(:,n)|x(:,n)|^4,$$

and so on. In this example, the kernels are represented by $y_1$, $y_2$, $y_3$, and any other higher-order kernels computed by the processor. The kernels are represented as non-linear functions x of time (represented by n) and correspond to the digital signal (e.g., to be transmitted after conversion to an analog signal and amplified by a power amplifier).

As further shown in FIG. 8, the processor may determine a kernel matrix based at least in part on the kernels (block 810). For example, the processor may determine $$\phi_t = [y_1 y_2 y_3 \ldots y_k],$$

where $\phi_t$ represents the kernel matrix and includes the kernels $y_1, y_2, y_3, \ldots y_k$ as columns within the matrix.

As further shown in FIG. 8, the processor may configure a local oscillator to cover a fraction of a total bandwidth associated with the digital signal (block 815). For example, the processor may configure the local oscillator to generate a tuning signal according to $e^{(i(\omega_c + \Delta)t)}$, where $\omega_c$ represents a reference frequency, $\Delta$ represents a range around the reference frequency that comprises the fraction of the total bandwidth, and t represents time.

Accordingly, as shown in FIG. 8, the processor may configure an ADC to sample input, from a downconverter tuned by the local oscillator, at a sub-rate corresponding to the first fraction (block 820). For example, the processor may configure the ADC to output a digital signal y(:, m)= $\mathcal{L}\{PA(x(:, m))\}$, where x(:, m) represents a non-linear function of time (represented by m) that the downconverter received from the power amplifier (represented by PA), and where $\mathcal{L}$ represents an analog filter.

Additionally, as further shown in FIG. 8, the processor may compute an average complex gain associated with the digital signal y(:, m) (block 825). For example, the processor may compute $$G = \frac{\text{Mean}\,[y_{ib}(:, m) \cdot x_{ib}^*(:, m)]}{\text{Mean}\,[x_{ib}(:, m) \cdot x_{ib}^*(:, m)]},$$

where G represents the average complex gain, $y_{ib}(:, m)$ represents the digital signal output by the ADC as a non-linear function of time (represented by m), $x_{ib}(:, m)$ represents the digital signal before amplification by the power amplifier as a non-linear function of time (represented by m), and $x_{ib}^*(:, m)$ is the conjugate of $x_{ib}(:, m)$. In some aspects, the processor may refrain from computing the average complex gain for digital signals sampled outside a modulation bandwidth Bm but inside a total bandwidth Bd.

As shown in FIG. 8, the processor may determine a band error based at least in the digital signal output by the ADC and the digital signal before amplification by the power amplifier (block 830). The processor may determine the error in a time domain. For example, the processor may determine $$E = h(y_r)/G - h(x_r),$$

where E represents the error, $h(y_r)$ represents a time domain filter applied to the digital signal output by the ADC (represented by $y_r$), G represents the average complex gain, and $h(x_r)$ represents a time domain filter applied to the digital signal before amplification by the power amplifier (represented by $x_r$).

Accordingly, the processor may rotate the kernels and decimate a rate associated with the kernels based at least in part on the first fraction (block 835). For example, the processor may compute $$\phi_{BB} = \mathcal{D}(\mathcal{R}(\phi_t)),$$

where $\phi_{BB}$ represents the rotated and decimated kernel matrix, $\phi_t$ represents the kernel matrix, $\mathcal{D}$ represents an anti-alias and decimate function, and $\mathcal{R}$ represents a rotation. In some aspects, $\mathcal{R}(y) = y(n) * e^{(i(\Delta(n))t)}$, where $y(n)$ represents a kernel that is rotated by $\mathcal{R}$, and $\Delta$ represents a phase associated with the rotation.

As further shown in FIG. 8, the processor may filter the kernel matrix (block 840) such that the error, which was determined in the time domain, can be used. For example, the processor may compute $$\phi = h(\phi_{BB}),$$

where $\phi_{BB}$ represents the rotated and decimated kernel matrix, $\phi$ represents the filtered kernel matrix in the time domain, and h represents a time domain filter.

Accordingly, the processor may update correlation matrices associated with the digital signal output by the ADC and the digital signal before amplification by the power amplifier (block 845). For example, the processor may determine $$Q = Q + \phi^H \phi \text{ and}$$

$$\rho = \rho + \phi^H E,$$

where Q and $\rho$ represent the correlation matrices, $\phi$ represents the filtered kernel matrix, $\phi^H$ represents the Hermitian transpose of the filtered kernel matrix, and E represents the error.

In some aspects, as shown in FIG. 8, the operations represented by blocks 815, 820, 825, 830, 835, 840, and/or 845 may be iterated. For example, as described above in connection with FIG. 6, the processor may shift the local oscillator and the ADC over time such that the total bandwidth (or a subset thereof) is covered incrementally across a plurality of fractions. Alternatively, as described above in connection with FIG. 7, the processor may use a plurality of local oscillators and ADCs such that the processor iterates the operations represented by blocks 815, 820, 825, 830, 835, 840, and/or 845 for each pair including one local oscillator and one ADC in order to cover the total bandwidth (or a subset thereof).

Thus, as further shown in FIG. 8, the processor may perform a least squares regression based at least in part on the correlation matrices (block 850). For example, the processor may determine $$\Delta a = Q^{-1} \rho,$$

where $\Delta a$ represents a change to a coefficient matrix associated with digital pre-distortion, $Q^{-1}$ represents a quasi-inverse of correlation matrix Q (updated according to block 845 described above), and $\rho$ represents the other correlation matrix (updated according to block 845 described above).

Accordingly, as shown in FIG. 8, the processor may update coefficients associated with the digital pre-distortion (block 860). For example, the processor may calculate $$a = a - \beta \cdot \Delta a,$$

where a represents the coefficient matrix associated with digital pre-distortion, $\Delta a$ represents the change to the coefficient matrix, and $\beta$ represents a scaling factor.

Thus, as shown in FIG. 8, the processor may update a new digital signal for transmission (block 865). For example, the processor may apply digital pre-distortion based at least in part on the updated coefficients such that $$x_{dpd} = x + \phi_t \cdot a,$$

where a represents the coefficient matrix associated with digital pre-distortion (updated according to block 860 described above), $\phi_t$ represents the kernel matrix, x represents the new digital signal for transmission, and $x_{dpd}$ represents the new digital signal after digital pre-distortion.

As indicated above, FIG. 8 is provided as an example. Other examples may differ from what is described with respect to FIG. 8.

Figure 9:
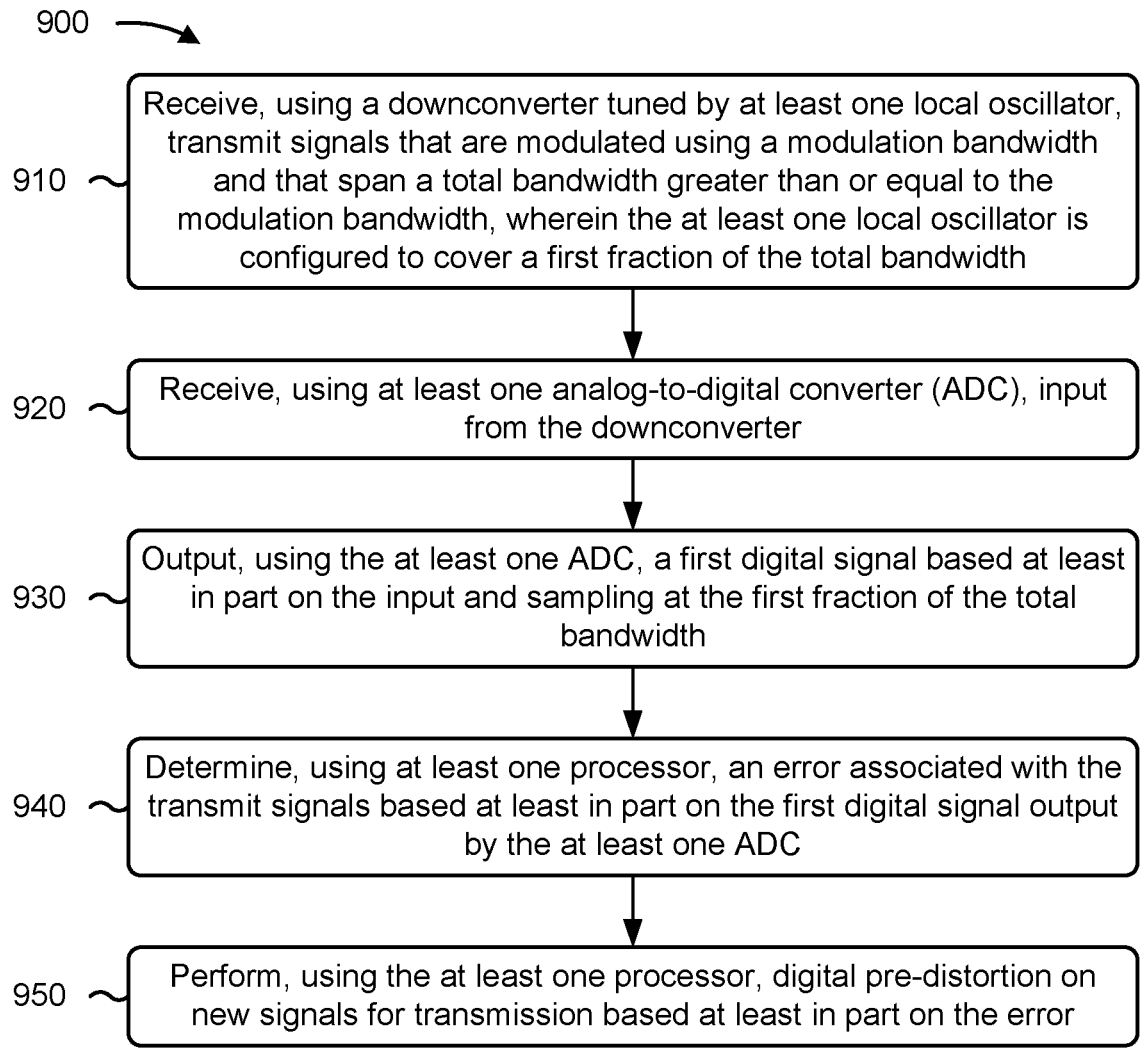
FIGS. 9, 10, and 11 are diagrams illustrating example processes associated with optimizing 5G fractional bandwidth DPD, in accordance with the present disclosure.

FIG. 9 is a diagram illustrating an example process 900 performed, for example, by a transceiver chain, in accordance with the present disclosure. Example process 900 is an example where the transceiver chain (e.g., transceiver chain 300, 400, 600, and/or 700 and/or a transceiver chain included in apparatus 1200 of FIG. 12) performs operations associated with hardware optimization for 5G fractional bandwidth DPD.

As shown in FIG. 9, in some aspects, process 900 may include receiving, using a downconverter tuned by at least one local oscillator, transmit signals that are modulated using a modulation bandwidth and that span a total bandwidth greater than or equal to the modulation bandwidth (block 910). For example, the transceiver chain (e.g., using reception component 1202, depicted in FIG. 12) may receive the transmit signals that are modulated using a modulation bandwidth and that span a total bandwidth greater than or equal to the modulation bandwidth, as described above. In some aspects, the at least one local oscillator is configured to cover a first fraction of the total bandwidth.

As further shown in FIG. 9, in some aspects, process 900 may include receiving, using at least one ADC, input from the downconverter (block 920). For example, the transceiver chain (e.g., using reception component 1202) may receive the input from the downconverter, as described above.

As further shown in FIG. 9, in some aspects, process 900 may include outputting, using the at least one ADC, a first digital signal based at least in part on the input and sampling at the first fraction of the total bandwidth (block 930). For example, the transceiver chain (e.g., using reception component 1202) may output the first digital signal based at least in part on the input and sampling at the first fraction of the total bandwidth, as described above.

As further shown in FIG. 9, in some aspects, process 900 may include determining, using at least one processor, an error associated with the transmit signals based at least in part on the first digital signal output by the at least one ADC (block 940). For example, the transceiver chain (e.g., using determination component 1208, depicted in FIG. 12) may determine the error associated with the transmit signals based at least in part on the first digital signal output by the at least one ADC, as described above.

As further shown in FIG. 9, in some aspects, process 900 may include performing, using the at least one processor, digital pre-distortion on new signals for transmission based at least in part on the error (block 950). For example, the transceiver chain (e.g., using transmission component 1204, depicted in FIG. 12) may perform the digital pre-distortion on new signals for transmission based at least in part on the error, as described above.

Process 900 may include additional aspects, such as any single aspect or any combination of aspects described below and/or in connection with one or more other processes described elsewhere herein.

In a first aspect, process 900 further includes determining (e.g., using determination component 1208) the digital pre-distortion using a least squares regression at a sub-rate corresponding to the first fraction of the total bandwidth.

In a second aspect, alone or in combination with the first aspect, the at least one local oscillator includes at least a first local oscillator configured to cover the first fraction of the total bandwidth and a second local oscillator configured to cover a second fraction of the total bandwidth, the at least one ADC includes at least a first ADC configured to output the first digital signal based at least in part on sampling at the first fraction of the total bandwidth and a second ADC configured to output a second digital signal based at least in part on sampling at the second fraction of the total bandwidth, and the error is further based at least in part on the second digital signal output by the second ADC.

In a third aspect, alone or in combination with one or more of the first and second aspects, process 900 further includes shifting (e.g., using reception component 1202) the at least one local oscillator to at least one second fraction of the total bandwidth, such that the at least one ADC is further configured to output at least one second digital signal based at least in part on sampling at the at least one second fraction of the total bandwidth, and the error is further based at least in part on the at least one second digital signal output by the at least one ADC.

In a fourth aspect, alone or in combination with one or more of the first through third aspects, the error is based at least in part on output from the at least one ADC that represents a subset of the total bandwidth.

In a fifth aspect, alone or in combination with one or more of the first through fourth aspects, process 900 further includes determining (e.g., using determination component 1208) an additional error based at least in part on output from the at least one ADC that represents a different subset of the total bandwidth, and adjusting (e.g., using transmission component 1204) the digital pre-distortion based at least in part on the additional error.

In a sixth aspect, alone or in combination with one or more of the first through fifth aspects, the subset includes a pattern of fractions of the total bandwidth including the first fraction.

In a seventh aspect, alone or in combination with one or more of the first through sixth aspects, the digital pre-distortion is applied at a rate greater than the modulation bandwidth.

In an eighth aspect, alone or in combination with one or more of the first through seventh aspects, the digital pre-distortion is applied at a rate equal to the modulation bandwidth.

In a ninth aspect, alone or in combination with one or more of the first through eighth aspects, the at least one local oscillator is included in a direct conversion receiver or an IF receiver.

In a tenth aspect, alone or in combination with one or more of the first through ninth aspects, the error is based at least in part on a band error computed in a frequency domain.

In an eleventh aspect, alone or in combination with one or more of the first through tenth aspects, the error is based at least in part on a band error computed in a time domain.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
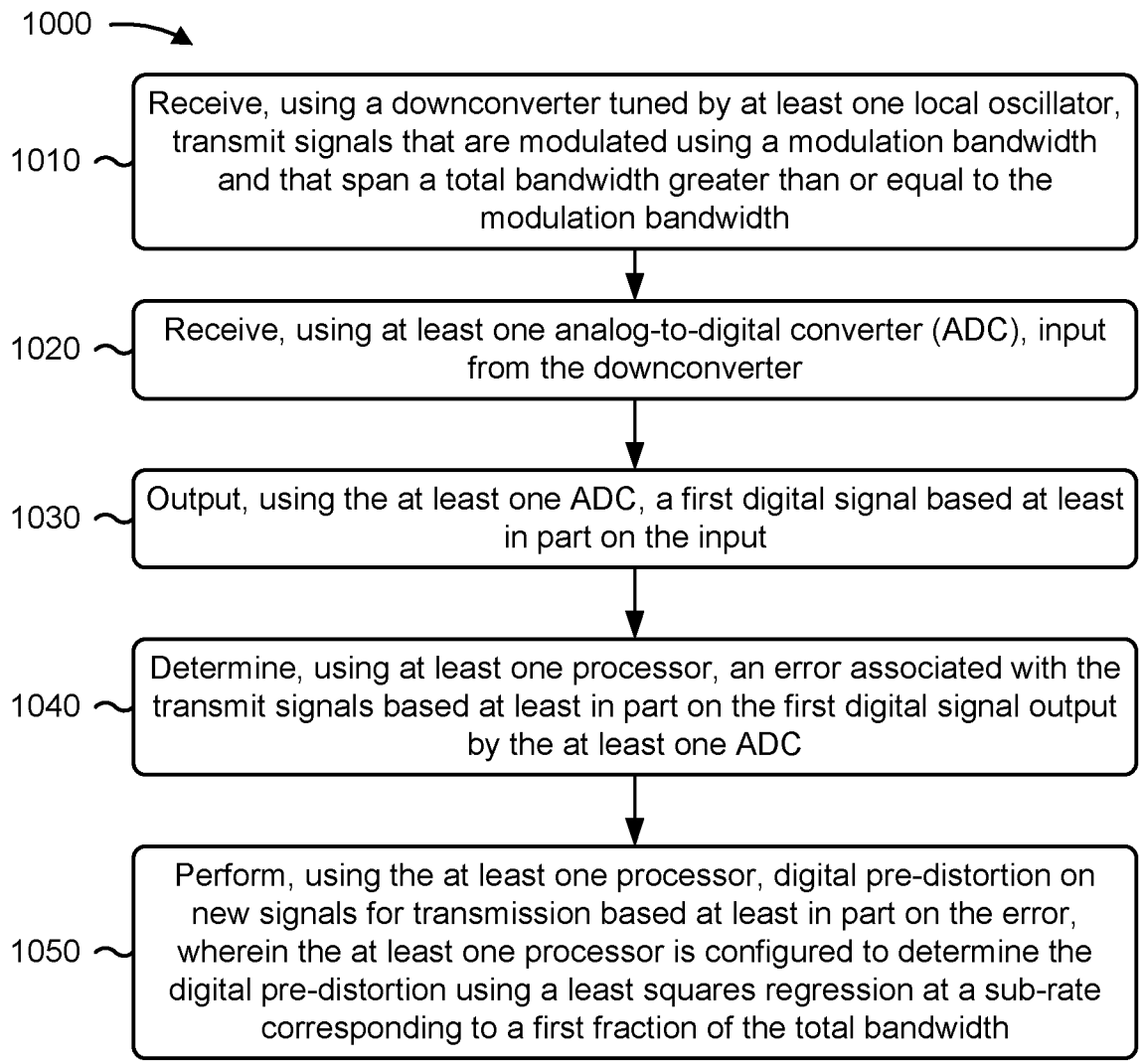

FIG. 10 is a diagram illustrating an example process 1000 performed, for example, by a transceiver chain, in accordance with the present disclosure. Example process 1000 is an example where the transceiver chain (e.g., transceiver chain 300, 400, 600, and/or 700 and/or a transceiver chain included in apparatus 1200 of FIG. 12) performs operations associated with hardware optimization for 5G fractional bandwidth DPD.

As shown in FIG. 10, in some aspects, process 1000 may include receiving, using a downconverter tuned by at least one local oscillator, transmit signals that are modulated using a modulation bandwidth and that span a total bandwidth greater than or equal to the modulation bandwidth (block 1010). For example, the transceiver chain (e.g., using reception component 1202, depicted in FIG. 12) may receive the transmit signals that are modulated using a modulation bandwidth and that span a total bandwidth greater than or equal to the modulation bandwidth, as described above.

As further shown in FIG. 10, in some aspects, process 1000 may include receiving, using at least one ADC, input from the downconverter (block 1020). For example, the transceiver chain (e.g., using reception component 1202) may receive the input from the downconverter, as described above.

As further shown in FIG. 10, in some aspects, process 1000 may include outputting, using the at least one ADC, a first digital signal based at least in part on the input (block 1030). For example, the transceiver chain (e.g., using reception component 1202) may output the first digital signal based at least in part on the input, as described above.

As further shown in FIG. 10, in some aspects, process 1000 may include determining, using at least one processor, an error associated with the transmit signals based at least in part on the first digital signal output by the at least one ADC (block 1040). For example, the transceiver chain (e.g., using determination component 1208, depicted in FIG. 12) may determine the error associated with the transmit signals based at least in part on the first digital signal output by the at least one ADC, as described above.

As further shown in FIG. 10, in some aspects, process 1000 may include performing, using the at least one processor, digital pre-distortion on new signals for transmission based at least in part on the error (block 1050). For example, the transceiver chain (e.g., using transmission component 1204, depicted in FIG. 12) may perform the digital pre-distortion on new signals for transmission based at least in part on the error, as described above. In some aspects, the transceiver chain may determine the digital pre-distortion using a least squares regression at a sub-rate corresponding to a first fraction of the total bandwidth.

Process 1000 may include additional aspects, such as any single aspect or any combination of aspects described below and/or in connection with one or more other processes described elsewhere herein.

In a first aspect, the at least one local oscillator includes at least a first local oscillator configured to cover the first fraction of the total bandwidth and a second local oscillator configured to cover a second fraction of the total bandwidth, the at least one ADC includes at least a first ADC configured to output the first digital signal based at least in part on sampling at the first fraction of the total bandwidth and a second ADC configured to output a second digital signal based at least in part on sampling at the second fraction of the total bandwidth, and the error is further based at least in part on the second digital signal output by the second ADC.

In a second aspect, alone or in combination with the first aspect, the at least one local oscillator is configured to cover the first fraction of the total bandwidth, and process 1000 further includes shifting (e.g., using reception component 1202) the at least one local oscillator from the first fraction of the total bandwidth to at least one second fraction of the total bandwidth, such that the at least one ADC is configured to output the first digital signal based at least in part on sampling at the first fraction of the total bandwidth and further configured to output at least one second digital signal based at least in part on sampling at the at least one second fraction of the total bandwidth, and the error is further based at least in part on the at least one second digital signal output by the at least one ADC.

In a third aspect, alone or in combination with one or more of the first and second aspects, the error is based at least in part on output from the at least one ADC that represents a subset of the total bandwidth.

In a fourth aspect, alone or in combination with one or more of the first through third aspects, process 1000 further includes determining (e.g., using determination component 1208) an additional error based at least in part on output from the at least one ADC that represents a different subset of the total bandwidth, and adjusting (e.g., using transmission component 1204) the digital pre-distortion based at least in part on the additional error.

In a fifth aspect, alone or in combination with one or more of the first through fourth aspects, the subset includes a pattern of fractions of the total bandwidth including the first fraction.

In a sixth aspect, alone or in combination with one or more of the first through fifth aspects, the digital pre-distortion is applied at a rate greater than the modulation bandwidth.

In a seventh aspect, alone or in combination with one or more of the first through sixth aspects, the digital pre-distortion is applied at a rate equal to the modulation bandwidth.

In an eighth aspect, alone or in combination with one or more of the first through seventh aspects, the at least one local oscillator is included in a direct conversion receiver or an IF receiver.

In a ninth aspect, alone or in combination with one or more of the first through eighth aspects, the error is based at least in part on a band error computed in a frequency domain.

In a tenth aspect, alone or in combination with one or more of the first through ninth aspects, the error is based at least in part on a band error computed in a time domain.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
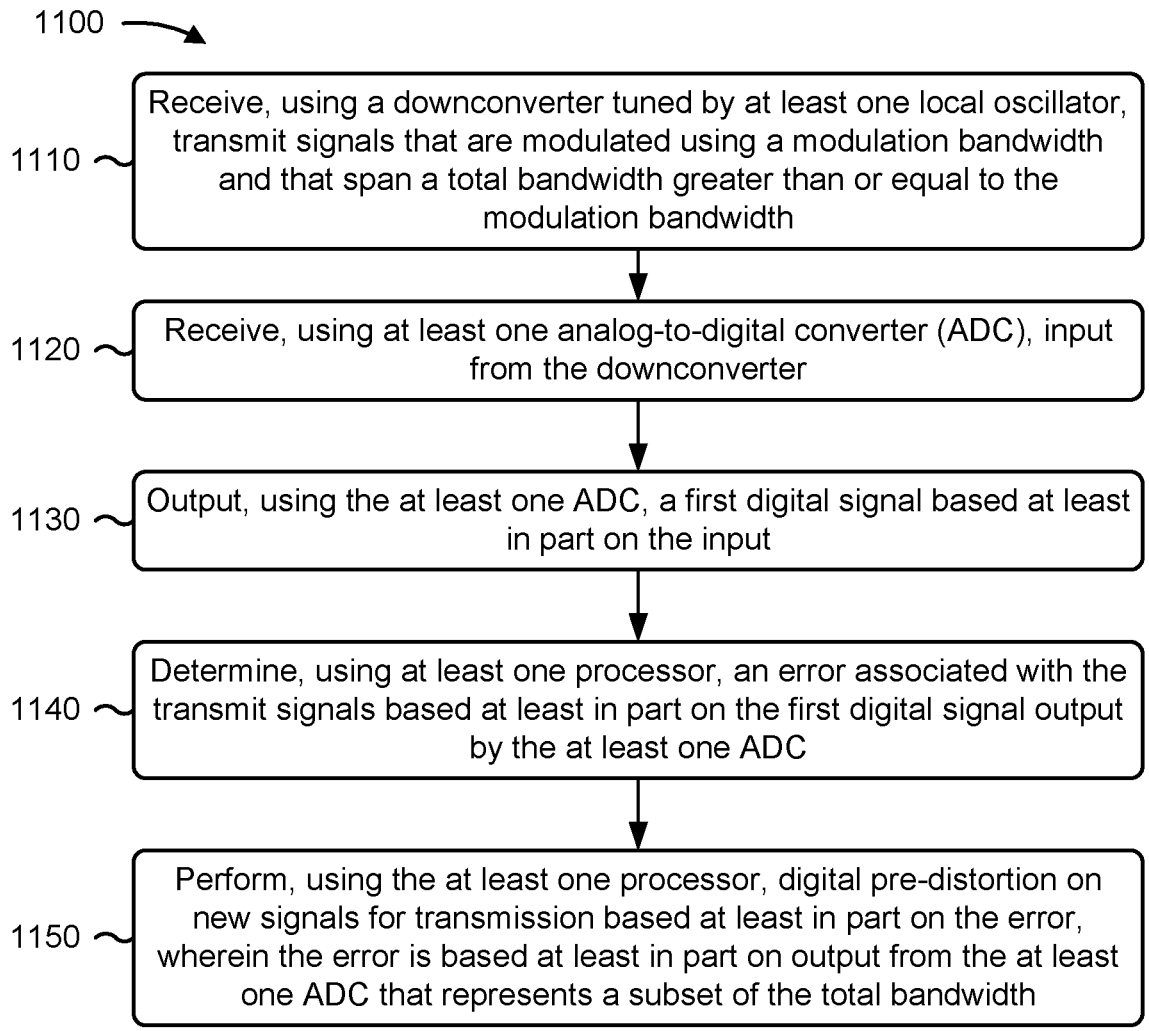

FIG. 11 is a diagram illustrating an example process 1100 performed, for example, by a transceiver chain, in accordance with the present disclosure. Example process 1100 is an example where the transceiver chain (e.g., transceiver chain 300, 400, 600, and/or 700 and/or a transceiver chain included in apparatus 1200 of FIG. 12) performs operations associated with hardware optimization for 5G fractional bandwidth DPD.

As shown in FIG. 11, in some aspects, process 1100 may include receiving, using a downconverter tuned by at least one local oscillator, transmit signals that are modulated using a modulation bandwidth and that span a total bandwidth greater than or equal to the modulation bandwidth (block 1110). For example, the transceiver chain (e.g., using reception component 1202, depicted in FIG. 12) may receive the transmit signals that are modulated using a modulation bandwidth and that span a total bandwidth greater than or equal to the modulation bandwidth, as described above.

As further shown in FIG. 11, in some aspects, process 1100 may include receiving, using at least one ADC, input from the downconverter (block 1120). For example, the transceiver chain (e.g., using reception component 1202) may receive the input from the downconverter, as described above.

As further shown in FIG. 11, in some aspects, process 1100 may include outputting, using the at least one ADC, a first digital signal based at least in part on the input (block 1130). For example, the transceiver chain (e.g., using reception component 1202) may output the first digital signal based at least in part on the input, as described above.

As further shown in FIG. 11, in some aspects, process 1100 may include determining, using at least one processor, an error associated with the transmit signals based at least in part on the first digital signal output by the at least one ADC (block 1140). For example, the transceiver chain (e.g., using determination component 1208, depicted in FIG. 12) may determine the error associated with the transmit signals based at least in part on the first digital signal output by the at least one ADC, as described above.

As further shown in FIG. 11, in some aspects, process 1100 may include performing, using the at least one processor, digital pre-distortion on new signals for transmission based at least in part on the error (block 1150). For example, the transceiver chain (e.g., using transmission component 1204, depicted in FIG. 12) may perform the digital pre-distortion on new signals for transmission based at least in part on the error, as described above. In some aspects, the error is based at least in part on output from the at least one ADC that represents a subset of the total bandwidth.

Process 1100 may include additional aspects, such as any single aspect or any combination of aspects described below and/or in connection with one or more other processes described elsewhere herein.

In a first aspect, process 1100 further includes determining (e.g., using determination component 1208) the digital pre-distortion using a least squares regression at a sub-rate corresponding to a first fraction of the total bandwidth.

In a second aspect, alone or in combination with the first aspect, the at least one local oscillator includes at least a first local oscillator configured to cover a first fraction of the total bandwidth and a second local oscillator configured to cover a second fraction of the total bandwidth, the at least one ADC includes at least a first ADC configured to output the first digital signal based at least in part on sampling at the first fraction of the total bandwidth and a second ADC configured to output a second digital signal based at least in part on sampling at the second fraction of the total bandwidth, and the error is further based at least in part on the second digital signal output by the second ADC.

In a third aspect, alone or in combination with one or more of the first and second aspects, the at least one local oscillator is configured to cover a first fraction of the total bandwidth, and process 1100 further includes shifting (e.g., using reception component 1202) the at least one local oscillator from the first fraction of the total bandwidth to at least one second fraction of the total bandwidth, such that the at least one ADC is configured to output the first digital signal based at least in part on sampling at the first fraction of the total bandwidth and further configured to output at least one second digital signal based at least in part on sampling at the at least one second fraction of the total bandwidth, and the error is further based at least in part on the at least one second digital signal output by the at least one ADC.

In a fourth aspect, alone or in combination with one or more of the first through third aspects, process 1100 further includes determining (e.g., using determination component 1208) an additional error based at least in part on output from the at least one ADC that represents a different subset of the total bandwidth, and adjusting (e.g., using transmission component 1204) the digital pre-distortion based at least in part on the additional error.

In a fifth aspect, alone or in combination with one or more of the first through fourth aspects, the subset includes a pattern of fractions of the total bandwidth.

In a sixth aspect, alone or in combination with one or more of the first through fifth aspects, the digital pre-distortion is applied at a rate greater than the modulation bandwidth.

In a seventh aspect, alone or in combination with one or more of the first through sixth aspects, the digital pre-distortion is applied at a rate equal to the modulation bandwidth.

In an eighth aspect, alone or in combination with one or more of the first through seventh aspects, the at least one local oscillator is included in a direct conversion receiver or an IF receiver.

In a ninth aspect, alone or in combination with one or more of the first through eighth aspects, the error is based at least in part on a band error computed in a frequency domain.

In a tenth aspect, alone or in combination with one or more of the first through ninth aspects, the error is based at least in part on a band error computed in a time domain.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
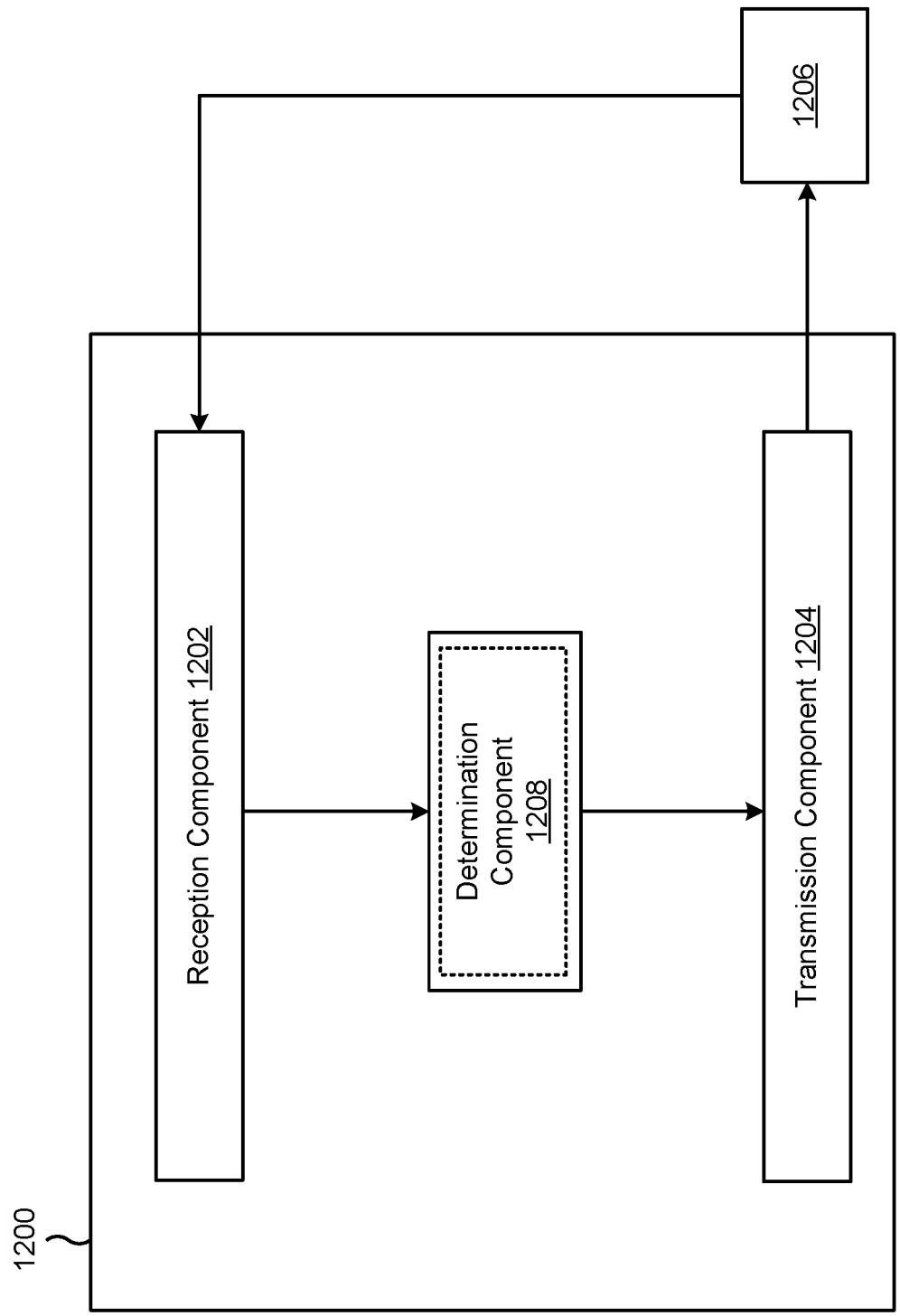
FIG. 12 is a block diagram of an example apparatus for wireless communication, in accordance with the present disclosure.

FIG. 12 is a block diagram of an example apparatus 1200 for wireless communication. The apparatus 1200 may be a base station or UE, or a base station or UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a determination component 1208, among other examples.

In some aspects, the apparatus 1200 may be configured to perform one or more operations described herein in connection with FIGS. 3-8. Additionally, or alternatively, the apparatus 1200 may be configured to perform one or more processes described herein, such as process 900 of FIG. 9, process 1000 of FIG. 10, process 1100 of FIG. 11, or a combination thereof. In some aspects, the apparatus 1200 and/or one or more components shown in FIG. 12 may include one or more components of the base station or UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station or UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station or UE described above in connection with FIG. 2. In some aspects, the transmission component 1204 may be co-located with the reception component 1202 in a transceiver.

In some aspects, the reception component 1202 may receive transmit signals (e.g., transmitted to the apparatus 1206 by the transmission component 1204) that are modulated using a modulation bandwidth and that span a total bandwidth greater than or equal to the modulation bandwidth. Accordingly, the reception component 1202 may output a first digital signal based at least in part on input including the received transmit signals. For example, one portion of the reception component 1202 (e.g., an ADC) may receive the input from another portion of the reception component (e.g., a downconverter tuned by a local oscillator) and generate the output based at least in part on the input. The determination component 1208 may determine an error associated with the transmit signals based at least in part on the first digital signal. Accordingly, the transmission component 1204 may perform digital pre-distortion on new signals for transmission (e.g., to the apparatus 1206) based at least in part on the error.

In some aspects, the reception component 1202 may be configured to cover a first fraction of the total bandwidth. Accordingly, the reception component 1202 may output the first digital signal based at least in part on sampling at the first fraction of the total bandwidth. In some aspects, the reception component 1202 may shift to at least one second fraction of the total bandwidth and output at least one second digital signal based at least in part on sampling at the at least one second fraction of the total bandwidth, and the determination component 1208 may determine the error further based at least in part on the at least one second digital signal.

Additionally, or alternatively, the determination component 1208 may determine the digital pre-distortion using a least squares regression at a sub-rate corresponding to the first fraction of the total bandwidth.

Additionally, or alternatively, the error may be based at least in part on output from the reception component 1202 that represents a subset of the total bandwidth. In some aspects, the determination component 1208 may determine an additional error based at least in part on output from the reception component 1202 that represents a different subset of the total bandwidth. Accordingly, the transmission component 1204 may adjust the digital pre-distortion based at least in part on the additional error.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a transceiver chain, comprising: receiving, using a downconverter tuned by at least one local oscillator, transmit signals that are modulated using a modulation bandwidth and that span a total bandwidth greater than or equal to the modulation bandwidth, wherein the at least one local oscillator is configured to cover a first fraction of the total bandwidth; receiving, using at least one analog-to-digital converter (ADC), input from the downconverter; outputting, using the at least one ADC, a first digital signal based at least in part on the input and sampling at the first fraction of the total bandwidth; determining, using at least one processor, an error associated with the transmit signals based at least in part on the first digital signal output by the at least one ADC; and performing, using the at least one processor, digital pre-distortion on new signals for transmission based at least in part on the error.

Aspect 2: The method of Aspect 1, further comprising: determining the digital pre-distortion using a least squares regression at a sub-rate corresponding to the first fraction of the total bandwidth.

Aspect 3: The method of any of Aspects 1 through 2, wherein the at least one local oscillator includes at least a first local oscillator configured to cover the first fraction of the total bandwidth and a second local oscillator configured to cover a second fraction of the total bandwidth, the at least one ADC includes at least a first ADC configured to output the first digital signal based at least in part on sampling at the first fraction of the total bandwidth and a second ADC configured to output a second digital signal based at least in part on sampling at the second fraction of the total bandwidth, and the error is further based at least in part on the second digital signal output by the second ADC.

Aspect 4: The method of any of Aspects 1 through 2, further comprising: shifting the at least one local oscillator to at least one second fraction of the total bandwidth, wherein the at least one ADC is further configured to output at least one second digital signal based at least in part on sampling at the at least one second fraction of the total bandwidth, and the error is further based at least in part on the at least one second digital signal output by the at least one ADC.

Aspect 5: The method of any of Aspects 1 through 4, wherein the error is based at least in part on output from the at least one ADC that represents a subset of the total bandwidth.

Aspect 6: The method of Aspect 5, further comprising: determining, using the at least one processor, an additional error based at least in part on output from the at least one ADC that represents a different subset of the total bandwidth; and adjusting the digital pre-distortion based at least in part on the additional error.

Aspect 7: The method of any of Aspects 5 through 6, wherein the subset includes a pattern of fractions of the total bandwidth including the first fraction.

Aspect 8: The method of any of Aspects 1 through 7, wherein the digital pre-distortion is applied at a rate greater than the modulation bandwidth.

Aspect 9: The method of any of Aspects 1 through 7, wherein the digital pre-distortion is applied at a rate equal to the modulation bandwidth.

Aspect 10: The method of any of Aspects 1 through 9, wherein the at least one local oscillator is included in a direct conversion receiver or an intermediate frequency receiver.

Aspect 11: The method of any of Aspects 1 through 10, wherein the error is based at least in part on a band error computed in a frequency domain.

Aspect 12: The method of any of Aspects 1 through 10, wherein the error is based at least in part on a band error computed in a time domain.

Aspect 13: A method of wireless communication performed by a transceiver chain, comprising: receiving, using a downconverter tuned by at least one local oscillator, transmit signals that are modulated using a modulation bandwidth and that span a total bandwidth greater than or equal to the modulation bandwidth; receiving, using at least one analog-to-digital converter (ADC), input from the downconverter; outputting, using the at least one ADC, a first digital signal based at least in part on the input; determining, using at least one processor, an error associated with the transmit signals based at least in part on the first digital signal output by the at least one ADC; and performing, using the at least one processor, digital pre-distortion on new signals for transmission based at least in part on the error, wherein the at least one processor is configured to determine the digital pre-distortion using a least squares regression at a sub-rate corresponding to a first fraction of the total bandwidth.

Aspect 14: The method of Aspect 13, wherein the at least one local oscillator includes at least a first local oscillator configured to cover the first fraction of the total bandwidth and a second local oscillator configured to cover a second fraction of the total bandwidth, the at least one ADC includes at least a first ADC configured to output the first digital signal based at least in part on sampling at the first fraction of the total bandwidth and a second ADC configured to output a second digital signal based at least in part on sampling at the second fraction of the total bandwidth, and the error is further based at least in part on the second digital signal output by the second ADC.

Aspect 15: The method of Aspect 13, wherein the at least one local oscillator is configured to cover the first fraction of the total bandwidth, and the method further comprises: shifting the at least one local oscillator from the first fraction of the total bandwidth to at least one second fraction of the total bandwidth, wherein the at least one ADC is configured to output the first digital signal based at least in part on sampling at the first fraction of the total bandwidth and further configured to output at least one second digital signal based at least in part on sampling at the at least one second fraction of the total bandwidth, and the error is further based at least in part on the at least one second digital signal output by the at least one ADC.

Aspect 16: The method of any of Aspects 13 through 15, wherein the error is based at least in part on output from the at least one ADC that represents a subset of the total bandwidth.

Aspect 17: The method of Aspect 16, further comprising: determining, using the at least one processor, an additional error based at least in part on output from the at least one ADC that represents a different subset of the total bandwidth; and adjusting the digital pre-distortion based at least in part on the additional error.

Aspect 18: The method of any of Aspects 16 through 17, wherein the subset includes a pattern of fractions of the total bandwidth including the first fraction.

Aspect 19: The method of any of Aspects 13 through 18, wherein the digital pre-distortion is applied at a rate greater than the modulation bandwidth.

Aspect 20: The method of any of Aspects 13 through 18, wherein the digital pre-distortion is applied at a rate equal to the modulation bandwidth.

Aspect 21: The method of any of Aspects 13 through 20, wherein the at least one local oscillator is included in a direct conversion receiver or an intermediate frequency receiver.

Aspect 22: The method of any of Aspects 13 through 21, wherein the error is based at least in part on a band error computed in a frequency domain.

Aspect 23: The method of any of Aspects 13 through 21, wherein the error is based at least in part on a band error computed in a time domain.

Aspect 24: A method of wireless communication performed by a transceiver chain, comprising: receiving, using a downconverter tuned by at least one local oscillator, transmit signals that are modulated using a modulation bandwidth and that span a total bandwidth greater than or equal to the modulation bandwidth; receiving, using at least one analog-to-digital converter (ADC), input from the downconverter; outputting, using the at least one ADC, a first digital signal based at least in part on the input; determining, using at least one processor, an error associated with the transmit signals based at least in part on the first digital signal output by the at least one ADC; and performing, using the at least one processor, digital pre-distortion on new signals for transmission based at least in part on the error, wherein the error is based at least in part on output from the at least one ADC that represents a subset of the total bandwidth.

Aspect 25: The method of Aspect 24, further comprising: determining the digital pre-distortion using a least squares regression at a sub-rate corresponding to a first fraction of the total bandwidth.

Aspect 26: The method of any of Aspects 24 through 25, wherein the at least one local oscillator includes at least a first local oscillator configured to cover a first fraction of the total bandwidth and a second local oscillator configured to cover a second fraction of the total bandwidth, the at least one ADC includes at least a first ADC configured to output the first digital signal based at least in part on sampling at the first fraction of the total bandwidth and a second ADC configured to output a second digital signal based at least in part on sampling at the second fraction of the total bandwidth, and the error is further based at least in part on the second digital signal output by the second ADC.

Aspect 27: The method of any of Aspects 24 through 25, wherein the at least one local oscillator is configured to cover a first fraction of the total bandwidth, and the method further comprises: shifting the at least one local oscillator from the first fraction of the total bandwidth to at least one second fraction of the total bandwidth, wherein the at least one ADC is configured to output the first digital signal based at least in part on sampling at the first fraction of the total bandwidth and further configured to output at least one second digital signal based at least in part on sampling at the at least one second fraction of the total bandwidth, and the error is further based at least in part on the at least one second digital signal output by the at least one ADC.

Aspect 28: The method of any of Aspects 24 through 27, further comprising: determining, using the at least one processor, an additional error based at least in part on output from the at least one ADC that represents a different subset of the total bandwidth; and adjusting the digital pre-distortion based at least in part on the additional error.

Aspect 29: The method of any of Aspects 24 through 28, wherein the subset includes a pattern of fractions of the total bandwidth.

Aspect 30: The method of any of Aspects 24 through 29, wherein the digital pre-distortion is applied at a rate greater than the modulation bandwidth.

Aspect 31: The method of any of Aspects 24 through 29, wherein the digital pre-distortion is applied at a rate equal to the modulation bandwidth.

Aspect 32: The method of any of Aspects 24 through 31, wherein the at least one local oscillator is included in a direct conversion receiver or an intermediate frequency receiver.

Aspect 33: The method of any of Aspects 24 through 32, wherein the error is based at least in part on a band error computed in a frequency domain.

Aspect 34: The method of any of Aspects 24 through 32, wherein the error is based at least in part on a band error computed in a time domain.

Aspect 35: An apparatus for wireless communication at a device, comprising a processor; memory coupled with the processor; and instructions stored in the memory and executable by the processor to cause the apparatus to perform the method of one or more Aspects of Aspects 1-12.

Aspect 36: A device for wireless communication, comprising a memory and one or more processors coupled to the memory, the memory and the one or more processors configured to perform the method of one or more Aspects of Aspects 1-12.

Aspect 37: An apparatus for wireless communication, comprising at least one means for performing the method of one or more Aspects of Aspects 1-12.

Aspect 38: A non-transitory computer-readable medium storing code for wireless communication, the code comprising instructions executable by a processor to perform the method of one or more Aspects of Aspects 1-12.

Aspect 39: A non-transitory computer-readable medium storing a set of instructions for wireless communication, the set of instructions comprising one or more instructions that, when executed by one or more processors of a device, cause the device to perform the method of one or more Aspects of Aspects 1-12.

Aspect 40: An apparatus for wireless communication at a device, comprising a processor; memory coupled with the processor; and instructions stored in the memory and executable by the processor to cause the apparatus to perform the method of one or more Aspects of Aspects 13-23.

Aspect 41: A device for wireless communication, comprising a memory and one or more processors coupled to the memory, the memory and the one or more processors configured to perform the method of one or more Aspects of Aspects 13-23.

Aspect 42: An apparatus for wireless communication, comprising at least one means for performing the method of one or more Aspects of Aspects 13-23.

Aspect 43: A non-transitory computer-readable medium storing code for wireless communication, the code comprising instructions executable by a processor to perform the method of one or more Aspects of Aspects 13-23.

Aspect 44: A non-transitory computer-readable medium storing a set of instructions for wireless communication, the set of instructions comprising one or more instructions that, when executed by one or more processors of a device, cause the device to perform the method of one or more Aspects of Aspects 13-23.

Aspect 45: An apparatus for wireless communication at a device, comprising a processor; memory coupled with the processor; and instructions stored in the memory and executable by the processor to cause the apparatus to perform the method of one or more Aspects of Aspects 24-34.

Aspect 46: A device for wireless communication, comprising a memory and one or more processors coupled to the memory, the memory and the one or more processors configured to perform the method of one or more Aspects of Aspects 24-34.

Aspect 47: An apparatus for wireless communication, comprising at least one means for performing the method of one or more Aspects of Aspects 24-34.

Aspect 48: A non-transitory computer-readable medium storing code for wireless communication, the code comprising instructions executable by a processor to perform the method of one or more Aspects of Aspects 24-34.

Aspect 49: A non-transitory computer-readable medium storing a set of instructions for wireless communication, the set of instructions comprising one or more instructions that, when executed by one or more processors of a device, cause the device to perform the method of one or more Aspects of Aspects 24-34.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transceiver chain for wireless communication, comprising:
at least one local oscillator configured to tune a downconverter to receive transmit signals that are modulated using a modulation bandwidth and that span a total bandwidth greater than or equal to the modulation bandwidth, wherein the at least one local oscillator is configured to cover a first fraction of the total bandwidth that is less than the total bandwidth;

at least one analog-to-digital converter (ADC) configured to receive input from the downconverter and to output a first digital signal based at least in part on the input and sampling at the first fraction of the total bandwidth; and at least one processor configured to determine an error associated with the transmit signals based at least in part on the first digital signal output by the at least one ADC and to perform digital pre-distortion on new signals for transmission based at least in part on the error.

2. The transceiver chain of claim 1, wherein the at least one processor is configured to determine the digital pre-distortion using a least squares regression at a sub-rate corresponding to the first fraction of the total bandwidth.

3. The transceiver chain of claim 1, wherein the at least one local oscillator includes at least a first local oscillator configured to cover the first fraction of the total bandwidth and a second local oscillator configured to cover a second fraction of the total bandwidth, the at least one ADC includes at least a first ADC configured to output the first digital signal based at least in part on sampling at the first fraction of the total bandwidth and a second ADC configured to output a second digital signal based at least in part on sampling at the second fraction of the total bandwidth, and the error is further based at least in part on the second digital signal output by the second ADC.

4. The transceiver chain of claim 1, wherein the at least one local oscillator is further configured to shift to at least one second fraction of the total bandwidth, the at least one ADC is further configured to output at least one second digital signal based at least in part on sampling at the at least one second fraction of the total bandwidth, and the error is further based at least in part on the at least one second digital signal output by the at least one ADC.

5. The transceiver chain of claim 1, wherein the error is based at least in part on output from the at least one ADC that represents a subset of the total bandwidth.

6. The transceiver chain of claim 5, wherein the at least one processor is further configured to determine an additional error based at least in part on output from the at least one ADC that represents a different subset of the total bandwidth and to adjust the digital pre-distortion based at least in part on the additional error.

7. The transceiver chain of claim 5, wherein the subset includes a pattern of fractions of the total bandwidth including the first fraction.

8. The transceiver chain of claim 1, wherein the digital pre-distortion is applied at a rate greater than the modulation bandwidth.

9. The transceiver chain of claim 1, wherein the digital pre-distortion is applied at a rate equal to the modulation bandwidth.

10. The transceiver chain of claim 1, wherein the at least one local oscillator is included in a direct conversion receiver or an intermediate frequency receiver.

11. The transceiver chain of claim 1, wherein the error is based at least in part on a band error computed in a frequency domain.

12. The transceiver chain of claim 1, wherein the error is based at least in part on a band error computed in a time domain.

13. A transceiver chain for wireless communication, comprising:

at least one local oscillator configured to tune a downconverter to receive transmit signals that are modulated using a modulation bandwidth and that span a total bandwidth greater than or equal to the modulation bandwidth;

at least one analog-to-digital converter (ADC) configured to receive input from the downconverter and to output a first digital signal based at least in part on the input; and at least one processor configured to determine an error associated with the transmit signals based at least in part on the first digital signal output by the at least one ADC and to perform digital pre-distortion on new signals for transmission based at least in part on the error, wherein the at least one processor is configured to determine the digital pre-distortion using a least squares regression and operating at a sub-rate corresponding to a first fraction of the total bandwidth.

14. The transceiver chain of claim 13, wherein the at least one local oscillator includes at least a first local oscillator configured to cover the first fraction of the total bandwidth and a second local oscillator configured to cover a second fraction of the total bandwidth, the at least one ADC includes at least a first ADC configured to output the first digital signal based at least in part on sampling at the first fraction of the total bandwidth and a second ADC configured to output a second digital signal based at least in part on sampling at the second fraction of the total bandwidth, and the error is further based at least in part on the second digital signal output by the second ADC.

15. The transceiver chain of claim 13, wherein the at least one local oscillator is configured to cover the first fraction of the total bandwidth and further configured to shift from the first fraction of the total bandwidth to at least one second fraction of the total bandwidth, the at least one ADC is configured to output the first digital signal based at least in part on sampling at the first fraction of the total bandwidth and further configured to output at least one second digital signal based at least in part on sampling at the at least one second fraction of the total bandwidth, and the error is further based at least in part on the at least one second digital signal output by the at least one ADC.

16. The transceiver chain of claim 13, wherein the error is based at least in part on output from the at least one ADC that represents a subset of the total bandwidth.

17. The transceiver chain of claim 16, wherein the at least one processor is further configured to determine an additional error based at least in part on output from the at least one ADC that represents a different subset of the total bandwidth and to adjust the digital pre-distortion based at least in part on the additional error.

18. The transceiver chain of claim 16, wherein the subset includes a pattern of fractions of the total bandwidth including the first fraction.

19. The transceiver chain of claim 13, wherein the digital pre-distortion is applied at a rate greater than the modulation bandwidth.

20. The transceiver chain of claim 13, wherein the digital pre-distortion is applied at a rate equal to the modulation bandwidth.

21. The transceiver chain of claim 13, wherein the at least one local oscillator is included in a direct conversion receiver or an intermediate frequency receiver.

22. The transceiver chain of claim 13, wherein the error is based at least in part on a band error computed in a frequency domain.

23. The transceiver chain of claim 13, wherein the error is based at least in part on a band error computed in a time domain.

24. A transceiver chain for wireless communication, comprising:
- at least one local oscillator configured to tune a downconverter to receive transmit signals that are modulated using a modulation bandwidth and that span a total bandwidth greater than or equal to the modulation bandwidth;
- at least one analog-to-digital converter (ADC) configured to receive input from the downconverter and to output a first digital signal based at least in part on the input; and
- at least one processor configured to determine, for a subset of the total bandwidth that is less than the total bandwidth, an error associated with the transmit signals based at least in part on the first digital signal output by the at least one ADC and to perform digital pre-distortion on new signals for transmission based at least in part on the error.

25. The transceiver chain of claim 24, wherein the at least one processor is configured to determine the digital pre-distortion using a least squares regression at a sub-rate corresponding to a first fraction of the total bandwidth.

26. The transceiver chain of claim 24, wherein the at least one local oscillator includes at least a first local oscillator configured to cover a first fraction of the total bandwidth and a second local oscillator configured to cover a second fraction of the total bandwidth, the at least one ADC includes at least a first ADC configured to output the first digital signal based at least in part on sampling at the first fraction of the total bandwidth and a second ADC configured to output a second digital signal based at least in part on sampling at the second fraction of the total bandwidth, and the error is further based at least in part on the second digital signal output by the second ADC.

27. The transceiver chain of claim 24, wherein the at least one local oscillator is configured to cover a first fraction of the total bandwidth and further configured to shift from the first fraction of the total bandwidth to at least one second fraction of the total bandwidth, the at least one ADC is configured to output the first digital signal based at least in part on sampling at the first fraction of the total bandwidth and further configured to output at least one second digital signal based at least in part on sampling at the at least one second fraction of the total bandwidth, and the error is further based at least in part on the at least one second digital signal output by the at least one ADC.

28. The transceiver chain of claim 24, wherein the at least one processor is further configured to determine an additional error based at least in part on output from the at least one ADC that represents a different subset of the total bandwidth and to adjust the digital pre-distortion based at least in part on the additional error.

29. The transceiver chain of claim 24, wherein the error is based at least in part on a band error computed in a time domain.

30. A method of wireless communication performed by a transceiver chain, comprising:
- receiving, using a downconverter tuned by at least one local oscillator, transmit signals that are modulated using a modulation bandwidth and that span a total bandwidth greater than or equal to the modulation bandwidth, wherein the at least one local oscillator is configured to cover a first fraction of the total bandwidth that is less than the total bandwidth;
- receiving, using at least one analog-to-digital converter (ADC), input from the downconverter;
- outputting, using the at least one ADC, a first digital signal based at least in part on the input and sampling at the first fraction of the total bandwidth;
- determining, using at least one processor, an error associated with the transmit signals based at least in part on the first digital signal output by the at least one ADC; and
- performing, using the at least one processor, digital pre-distortion on new signals for transmission based at least in part on the error.

* * * * *